(12) United States Patent
Tabata et al.

(10) Patent No.: US 12,447,814 B2
(45) Date of Patent: Oct. 21, 2025

(54) VEHICLE DRIVE DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Akinori Homan, Toyota (JP); Yosuke Akiyama, Susono (JP); Akira Ijichi, Odawara (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 899 days.

(21) Appl. No.: 17/673,109

(22) Filed: Feb. 16, 2022

(65) Prior Publication Data
US 2022/0268347 A1 Aug. 25, 2022

(30) Foreign Application Priority Data
Feb. 25, 2021 (JP) .................................. 2021-028876

(51) Int. Cl.
*B60K 6/52* (2007.10)
*B60K 17/346* (2006.01)
(52) U.S. Cl.
CPC ............ *B60K 6/52* (2013.01); *B60K 17/3462* (2013.01)
(58) Field of Classification Search
CPC ........ B60K 6/52; B60K 17/3462; B60K 6/20; B60K 17/346
See application file for complete search history.

(56) References Cited

U.S. PATENT DOCUMENTS

| | | | | |
|---|---|---|---|---|
| 3,963,085 A | * | 6/1976 | Vinton | F16H 61/0262 180/24.09 |
| 5,730,676 A | * | 3/1998 | Schmidt | B60W 20/10 903/910 |
| 7,128,675 B2 | * | 10/2006 | Klemen | B60K 6/365 475/5 |
| 8,147,366 B2 | * | 4/2012 | Kawasaki | B60K 1/02 180/65.265 |

(Continued)

FOREIGN PATENT DOCUMENTS

WO 2010/141682 A1 12/2010

*Primary Examiner* — Valentin Neacsu
*Assistant Examiner* — Michael R Stabley
(74) *Attorney, Agent, or Firm* — Oliff PLC

(57) ABSTRACT

In a vehicle drive device, a second power source is connected to a first rotating element of a differential mechanism. The other output shaft of a first output shaft and a second output shaft is connected to a third rotating element so as to be disconnectable and connectable by a disconnection-connection mechanism. A control device places the disconnection-connection mechanism in a disconnected state. When a second traveling mode in which the third rotating element is fixed to a fixing member through engagement of a first engaging element is switched to a first traveling mode in which the disconnection-connection mechanism is placed in a connected state, the control device disengages the first engaging element, executes synchronous control in which rotational speeds of the other output shaft and the third rotating element are synchronized by a second engaging element, and switches the disconnection-connection mechanism from the disconnected state to the connected state.

3 Claims, 22 Drawing Sheets

(56) References Cited

U.S. PATENT DOCUMENTS

| | | | | |
|---|---|---|---|---|
| 8,231,491 | B2* | 7/2012 | Oba | B60K 6/547 |
| | | | | 475/5 |
| 8,888,638 | B2* | 11/2014 | Mueller | B60K 6/48 |
| | | | | 475/5 |
| 2006/0108166 | A1* | 5/2006 | Tanaka | B60W 10/08 |
| | | | | 180/248 |
| 2007/0034428 | A1* | 2/2007 | Janson | B60K 6/365 |
| | | | | 180/65.235 |
| 2007/0093341 | A1* | 4/2007 | Supina | B60K 6/46 |
| | | | | 475/5 |
| 2009/0076696 | A1* | 3/2009 | Perkins | B60W 10/10 |
| | | | | 477/79 |
| 2009/0250278 | A1* | 10/2009 | Kawasaki | B60K 6/543 |
| | | | | 903/910 |

* cited by examiner

|  | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |
| R | ○ |  |  | ○ |  |

FIG. 9

| DRIVE STATE | MODE | BF1 | CF1 | D1 | | D2 | |
|---|---|---|---|---|---|---|---|
| | | | | (1) | (2) | (1) | (2) |
| 1 | EV(FF)_ Hi | | ○ | ○ | | | |
| 2 | EV(FF)_ Lo | ○ | | ○ | | | |
| 3 | H4_TORQUE SPLIT | | | ○ | | ○ | |
| 4 | H4_ LSD | | ○ CONTROL | ○ | | ○ | |
| 5 | H4_ Lock | | | ○ | | | ○ |
| 6 | L4_ Lock | ○ | | | ○ | | ○ |

FIG. 19

| DRIVE STATE | MODE | BF1 | CF1 | D1 | | D2 | |
|---|---|---|---|---|---|---|---|
| | | | | (1) | (2) | (1) | (2) |
| 1 | EV(FR)_Hi | | O | O | | | |
| 2 | EV(FR)_Lo | O | | O | | | |
| 3 | H4_TORQUE SPLIT | | | O | | O | |
| 4 | H4_LSD | | O CONTROL | O | | O | |
| 5 | H4_Lock | | | O | | | O |
| 6 | L4_Lock | O | | | O | | O |

VEHICLE DRIVE DEVICE

CROSS-REFERENCE TO RELATED APPLICATION

This application claims priority to Japanese Patent Application No. 2021-028876 filed on Feb. 25, 2021, incorporated herein by reference in its entirety.

BACKGROUND

1. Technical Field

The present disclosure relates to a vehicle drive device.

2. Description of Related Art

WO 2010/141682 discloses a vehicle drive device including a first power source, a second power source, a first output shaft, a second output shaft, and a differential mechanism. The first output shaft is connected to the first power source and outputs power to one of front wheels and rear wheels. The second output shaft outputs power to the other of the front wheels and the rear wheels. The differential mechanism includes a first rotating element, a second rotating element, and a third rotating element. In the vehicle drive device disclosed in WO 2010/141682, a first driving mode in which the vehicle travels in a four-wheel drive state using at least power output from the first power source and a second traveling mode in which the vehicle travels in a two-wheel drive state using power output from the second power source can be realized.

SUMMARY

In the vehicle drive device disclosed in WO 2010/141682, it is conceivable that the differential mechanism has a configuration in which the second power source is connected to the first rotating element, one output shaft of the first output shaft and the second output shaft is connected to the second rotating element, the other output shaft of the first output shaft and the second output shaft is connected to the third rotating element by a disconnection-connection mechanism so as to be disconnectable and connectable, and it is also conceivable that, in the differential mechanism, the third rotating element can be selectively fixed to a fixing member through engagement of an engaging element. In this case, placing the disconnection-connection mechanism in a connected state in which the disconnection-connection mechanism connects the other output shaft and the third rotating element makes it possible to realize the first traveling mode in which the vehicle travels in the four-wheel drive state using at least the power output from the first power source. Further, placing the disconnection-connection mechanism in a disconnected state in which the disconnection-connection mechanism disconnects the other output shaft from the third rotating element and fixing the third rotating element to the fixing member through engagement of the engaging element make it possible to realize the second traveling mode in which the vehicle travels in the two-wheel drive state using the power output from the second power source. However, in this case, there is an issue that when the second traveling mode is switched to the first traveling mode, the other output shaft cannot be appropriately connected to the third rotating element by the disconnection-connection mechanism because there is a rotational speed difference between the third rotating element and the other output shaft.

The present disclosure has been made in view of the above issue, and an object of the present disclosure is to provide a vehicle drive device capable of appropriately connecting the other output shaft and the third rotating element by the disconnection-connection mechanism when the second traveling mode in which the vehicle travels in the two-wheel drive state using the power output from the second power source is switched to the first driving mode in which the vehicle travels in the four-wheel drive state using at least the power output from the first power source.

In order to solve the above issue and achieve the object, a vehicle drive device according to the present disclosure includes: a first power source; a second power source; a first output shaft that is connected to the first power source and outputs power to one of front wheels and rear wheels; a second output shaft that outputs power to the other of the front wheels and the rear wheels; a differential mechanism provided with a first rotating element, a second rotating element, and a third rotating element; and control device. In the vehicle drive device, in the differential mechanism, the first rotating element is connected to the second power source, one output shaft of the first output shaft and the second output shaft is connected to the second rotating element, and the other output shaft of the first output shaft and the second output shaft is connected to the third rotating element via a disconnection-connection mechanism so as to be disconnectable and connectable, and the third rotating element is selectively fixed to a fixing member through engagement of a first engaging element, and any two of the first rotating element, the second rotating element, and the third rotating element are selectively connected through engagement of a second engaging element. The control device is configured to place the disconnection-connection mechanism in a connected state in which the disconnection-connection mechanism connects the other output shaft and the third rotating element when a first traveling mode in which a vehicle travels in a four-wheel drive state using at least the power output from the first power source is set, place the disconnection-connection mechanism in a disconnected state in which the disconnection-connection mechanism disconnects the other output shaft from the third rotating element and engage the first engaging element when a second traveling mode in which the vehicle travels in a two-wheel drive state using the power output from the second power source is set, and disengage the first engaging element, execute synchronous control in which rotational speeds of the other output shaft and the third rotating element are synchronized with each other by the second engaging element, and switch the disconnection-connection mechanism from the disconnected state to the connected state when the second traveling mode is switched to the first traveling mode.

With this configuration, in the vehicle drive device according to the present disclosure, the other output shaft can be appropriately connected to the third rotating element by the disconnection-connection mechanism when the second traveling mode in which the vehicle travels in the two-wheel drive state using the power output from the second power source is switched to the first traveling mode in which the vehicle travels in the four-wheel drive state using at least the power output from the first power source.

Further, in the above, the control device may be configured to cause the second power source to output the power even under the synchronous control in addition to a case where the second traveling mode is set.

With this configuration, the two-wheel drive state using the power output from the second power source can be set even under the synchronous control.

Further, in the above, the control device may be configured to disengage the second engaging element after the disconnection-connection mechanism is switched from the disconnected state to the connected state when the second traveling mode is switched to the first traveling mode.

With this configuration, the first rotating element receives the torque transferred from the other output shaft to the third rotating element with the torque from the second power source as a reaction force such that the torque transferred to the third rotating element can be distributed to the front wheels and the rear wheels at an arbitrary ratio.

The vehicle drive device according to the present disclosure can achieve an effect that the other output shaft can be appropriately connected to the third rotating element by the disconnection-connection mechanism when the second traveling mode in which the vehicle travels in the two-wheel drive state using the power output from the second power source is switched to the first driving mode in which the vehicle travels in the four-wheel drive state using at least the power output from the first power source.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a diagram showing the relationship between each of the drive states of the transfer and an operating state of each engaging device;

FIG. 19 is a diagram showing the relationship between each of the drive states of the transfer according to the second embodiment and an operating state of each engaging device;

DETAILED DESCRIPTION OF EMBODIMENTS

First Embodiment

A first embodiment of a vehicle drive device according to the present disclosure will be described below. Note that, an applicable embodiment of the present disclosure is not limited to the present embodiment.

Figure 1:
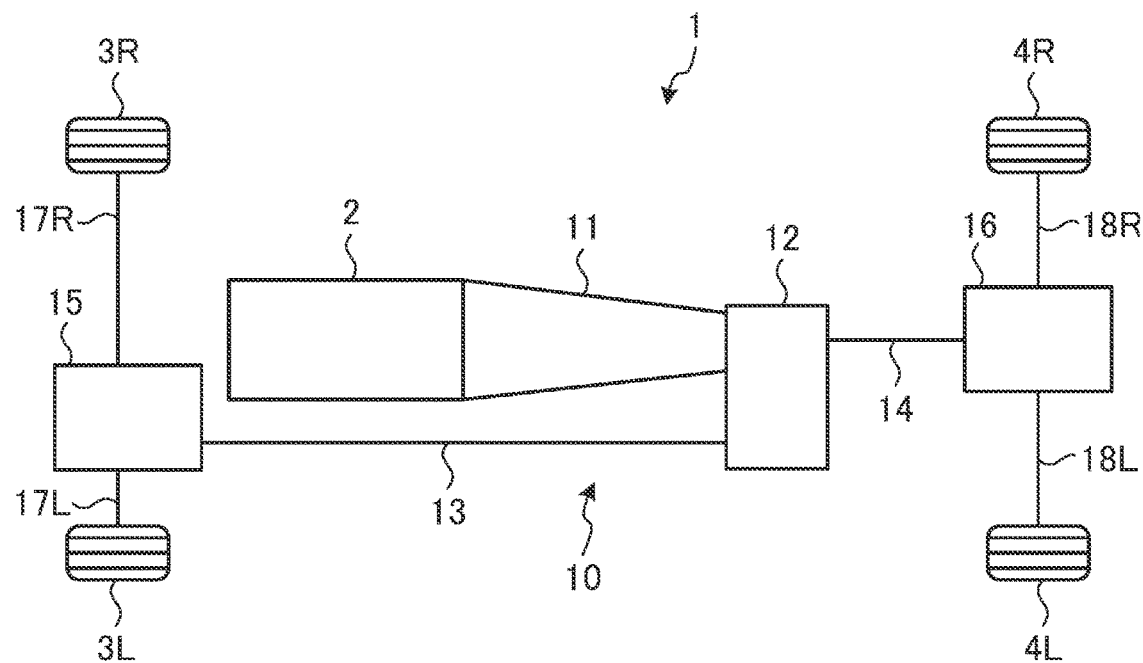
FIG. 1 is a diagram showing a schematic configuration of a vehicle provided with a drive device according to a first embodiment.

FIG. 1 is a diagram showing a schematic configuration of a vehicle 1 provided with a drive device 10 according to the first embodiment. The vehicle 1 includes right and left front wheels 3R, 3L, right and left rear wheels 4R, 4L, and the drive device 10 that transfers power from an engine 2 as a first power source to the right and left front wheels 3R, 3L and the right and left rear wheels 4R, 4L. This vehicle 1 is a four-wheel drive vehicle based on front-engine, rear-wheel-drive layout.

The drive device 10 includes the engine 2, a compound transmission 11 connected to the engine 2, a transfer 12 that is a front-rear wheel power distribution device connected to the compound transmission 11, and a front propeller shaft 13 and a rear propeller shaft 14 that are both connected to the transfer 12, a front-wheel differential gear mechanism 15 connected to the front propeller shaft 13, a rear-wheel differential gear mechanism 16 connected to the rear propeller shaft 14, right and left front wheel axles 17R, 17L connected to the front-wheel differential gear mechanism 15, right and left rear wheel axles 18R, 18L connected to the rear-wheel differential gear mechanism 16. Note that, when the right and left of the wheels and the wheel axles are not particularly differentiated from each other, reference signs R and L are omitted, and the terms are described as the front wheels 3, the rear wheels 4, the front wheel axles 17, and the rear wheel axles 18.

The engine 2 is a known internal combustion engine such as a gasoline engine or a diesel engine. In the engine 2, engine torque that is the output torque from the engine 2 is controlled by controlling an engine control device 101 such as a throttle actuator, a fuel injection device, and an ignition device provided in the engine 2 by an electronic control device 100 that will be described later.

The power output from the engine 2 is transferred to the transfer 12 via the compound transmission 11. Then, the power transferred to the transfer 12 is sequentially transferred from the transfer 12 to the rear wheels 4 via the rear propeller shaft 14, the rear-wheel differential gear mechanism 16, and the rear wheel axles 18 that constitute a power transfer path on the rear wheel side. A part of the power transferred to the transfer 12 is distributed to the front wheels 3 by the transfer 12, and is transferred to the front wheels 3 via the front propeller shaft 13, the front-wheel differential gear mechanism 15, and the front wheel axles 17 that constitute a power transfer path on the front wheel side. Unless otherwise specified, the power has the same meaning as the torque and the force.

Figure 2:
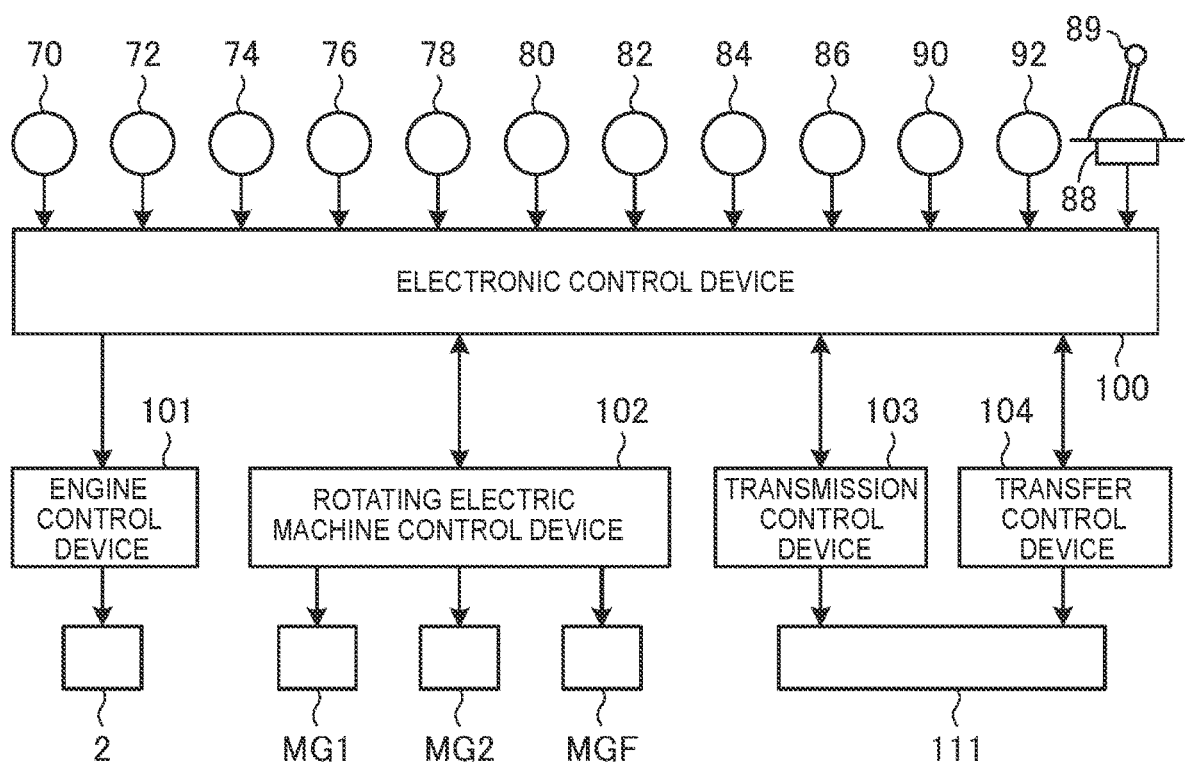
FIG. 2 is a diagram illustrating a main portion of a control system for various controls in the drive device according to the first embodiment.

As shown in FIG. 2, the drive device 10 includes the electronic control device 100. The electronic control device 100 includes, for example, a so-called microcomputer provided with a central processing unit (CPU), a random access memory (RAM), a read-only memory (ROM), and an input and output interface. The CPU executes various controls by executing signal processing in accordance with a program stored in the ROM in advance while using a transitory storage function of the RAM.

Output signals from various sensors and switches provided in the vehicle 1 (for example, an engine speed sensor 70, an output rotational speed sensor 72, an MG1 rotational speed sensor 74, an MG2 rotational speed sensor 76, an accelerator operation amount sensor 78, a throttle valve opening degree sensor 80, a battery sensor 82, an oil temperature sensor 84, a four-wheel-drive (4WD) selection switch 86, a shift position sensor 88 of a shift lever 89, a Low selection switch 90, and a Lock selection switch 92) and the like are input to the electronic control device 100. Further, the electronic control device 100 calculates a state-of-charge value SOC [%] as a value indicating a charge state of the battery based on, for example, charge and discharge current and a battery voltage of the battery that is a power storage device.

The electronic control device 100 outputs various command signals (for example, an engine control command signal for controlling the engine 2, a rotating electric machine control command signal for controlling a first rotating electric machine MG1, a second rotating electric machine MG2, and a third rotating electric machine MGF, and a hydraulic control command signal for controlling a hydraulic pressure of a hydraulic control circuit 111 that controls operating states of engaging devices of the compound transmission 11 and engaging devices of the transfer 12) to the respective devices provided in the vehicle 1 (for example, the engine control device 101, a rotating electric machine control device 102, a transmission control device 103, and a transfer control device 104).

Figures 3, 4:
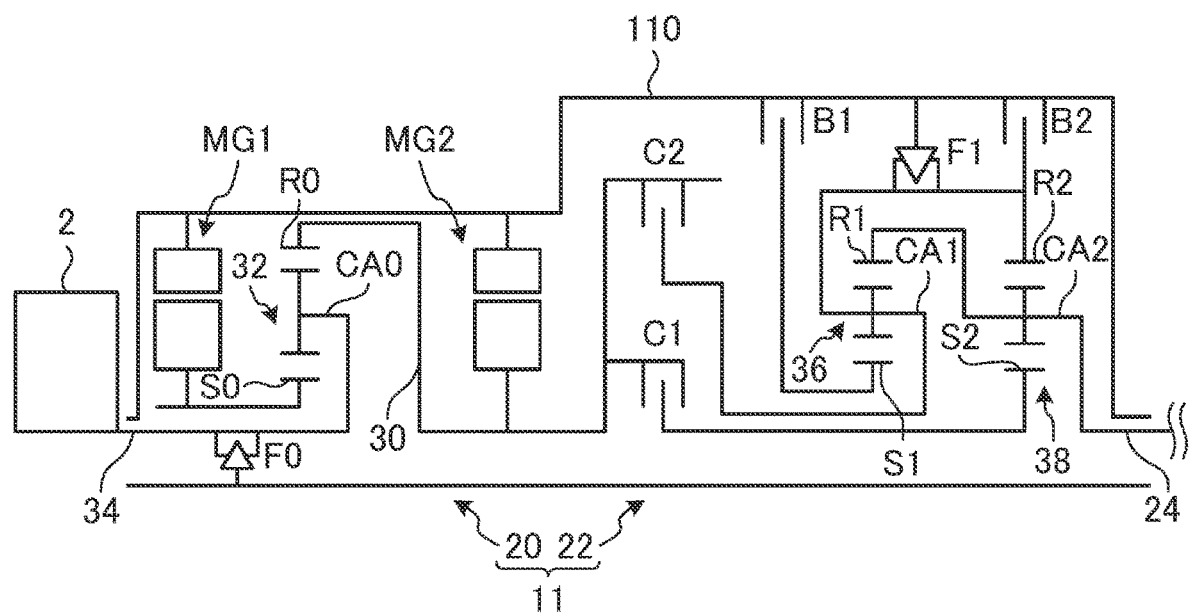
FIG. 3 is a diagram illustrating a schematic configuration of a compound transmission according to the first embodiment.
FIG. 4 is a diagram illustrating the relationship of the combination between the AT gear stage of a stepped transmission unit and the operation of an engaging device.

FIG. 3 is a diagram illustrating a schematic configuration of the compound transmission 11 according to the first embodiment. The first rotating electric machine MG1 and the second rotating electric machine MG2 are rotating electric machines having a function as a motor and a function as a generator, and are so-called motor generators. The first rotating electric machine MG1 and the second rotating electric machine MG2 function as a power source for traveling capable of generating drive torque. The first rotating electric machine MG1 and the second rotating electric machine MG2 are each connected to the battery (not shown) as a power storage device provided in the vehicle 1 via an inverter (not shown) provided in the vehicle 1. The rotating electric machine control device 102 controls the inverter so as to control MG1 torque and MG2 torque that are the output torques from the first rotating electric machine MG1 and the second rotating electric machine MG2, respectively. The output torque from the rotating electric machine is power running torque in the positive torque on the acceleration side and regenerative torque in the negative torque on the deceleration side. The battery is a power storage device that supplies and receives electric power to and from each of the first rotating electric machine MG1 and the second rotating electric machine MG2. Therefore, the vehicle 1 is a hybrid vehicle.

The compound transmission 11 is provided with a continuously variable transmission unit 20 that is an electric differential unit and a stepped transmission unit 22 that is a mechanical transmission. The continuously variable transmission unit 20 and the stepped transmission unit 22 are disposed in series on a common axis in a transmission case 110 as a non-rotating member attached to a vehicle body. The continuously variable transmission unit 20 is directly or indirectly connected to the engine 2 via a damper (not shown) or the like. The stepped transmission unit 22 is connected to the output side of the continuously variable transmission unit 20. Further, an output shaft 24 that is an output rotating member of the stepped transmission unit 22 is connected to the transfer 12. In the drive device 10, the power output from the engine 2 is transferred to the stepped transmission unit 22, and is transferred from the stepped transmission unit 22 to the drive wheels via the transfer 12 and the like. Further, the continuously variable transmission unit 20, the stepped transmission unit 22, and the like are configured substantially symmetrically with respect to the common axis, and the lower half of the axis is omitted in FIG. 3. The common axis above is the axis of the crankshaft of the engine 2, a connecting shaft 34, and the like.

The continuously variable transmission unit 20 is provided with the first rotating electric machine MG1 and a differential mechanism 32. The differential mechanism 32 is a power split mechanism that mechanically splits the power from the engine 2 to the first rotating electric machine MG1 and an intermediate transfer member 30 that is an output rotating member of the continuously variable transmission unit 20. The second rotating electric machine MG2 is connected to the intermediate transfer member 30 such that power can be transferred to the second rotating electric machine MG2. The continuously variable transmission unit 20 is an electric differential unit in which the differential state of the differential mechanism 32 is controlled by controlling the operating state of the first rotating electric machine MG1. The continuously variable transmission unit 20 is operated as an electric continuously variable transmission in which a gear ratio that is a value of the ratio of the engine speed to an MG2 rotational speed is variable. The engine speed has the same value as a rotational speed of the connecting shaft 34 serving as an input rotating member. The MG2 rotational speed is a rotational speed of the intermediate transfer member 30 serving as an output rotating member.

The differential mechanism 32 is configured by a single pinion type planetary gear device, and includes a sun gear S0, a carrier CA0, and a ring gear R0. The engine 2 is connected to the carrier CA0 via the connecting shaft 34 such that power can be transferred. The first rotating electric machine MG1 is connected to the sun gear S0 such that power can be transferred. The second rotating electric machine MG2 is connected to the ring gear R0 such that power can be transferred. In the differential mechanism 32, the carrier CA0 functions as an input element, the sun gear S0 functions as a reaction force element, and the ring gear R0 functions as an output element.

The stepped transmission unit 22 is a mechanical transmission unit serving as a stepped transmission constituting a part of a power transfer path between the intermediate transfer member 30 and the transfer 12, that is, a mechanical transmission unit constituting a part of the power transfer path between the continuously variable transmission unit 20 and the transfer 12. The intermediate transfer member 30 also functions as an input rotating member of the stepped transmission unit 22. The stepped transmission unit 22 is an automatic transmission (AT) of a known planetary gear type that includes, for example, a plurality of sets of planetary gear devices composed of a first planetary gear device 36 and a second planetary gear device 38, and a plurality of engaging devices of a clutch C1, a clutch C2, a brake B1, and a brake B2, including a one-way clutch F1. Hereinafter, the clutch C1, the clutch C2, the brake B1, and the brake B2 are simply referred to as an engaging device unless specifically distinguished.

The engaging device is a hydraulic friction engaging device configured by a multi-plate or single plate clutch or brake pressed by a hydraulic actuator, a band brake tightened by the hydraulic actuator, or the like. An operating state of the engaging device is switched between operating states such as engagement and disengagement by each of hydraulic pressures as adjusted predetermined hydraulic pressures output from the hydraulic control circuit 111 provided in the vehicle 1.

In the stepped transmission unit 22, the rotating elements of the first planetary gear device 36 and the second planetary gear device 38 are partially connected to each other or each connected to the intermediate transfer member 30, the transmission case 110, or the output shaft 24 directly or indirectly via the engaging device or the one-way clutch F1. Each rotating element of the first planetary gear device 36 includes a sun gear S1, a carrier CA1, and a ring gear R1, and each rotating element of the second planetary gear device 38 includes a sun gear S2, a carrier CA2, and a ring gear R2.

The stepped transmission unit 22 is a stepped transmission in which any of a plurality of shift stages (also referred to as gear stages) among the gear stages having gear ratios (=AT input rotational speed/output rotational speed) that differ depending on, for example, engagement of a predetermined engaging device that is any of the engaging devices. That is, in the stepped transmission unit 22, the gear stage is switched, that is, speed change is executed, by selectively engaging the engaging devices. The stepped transmission unit 22 is a stepped automatic transmission in which each of a plurality of gear stages is formed. In the first embodiment, the gear stage formed by the stepped transmission unit 22 is referred to as an AT gear stage. The AT input rotational speed is the input rotational speed of the stepped transmission unit 22 that is the rotational speed of the input rotating member of the stepped transmission unit 22, and has the same value as the rotational speed of the intermediate transfer member 30. Further, the AT input rotational speed has the same value as the MG2 rotational speed that is the rotational speed of the second rotating electric machine MG2. The AT input rotational speed can be expressed by the MG2 rotational speed. The output rotational speed is the rotational speed of the output shaft 24 that is the output rotational speed of the stepped transmission unit 22, and is also the output rotational speed of the compound transmission 11 that is the entire transmission in which the continuously variable transmission unit 20 and the stepped transmission unit 22 are combined. The compound transmission 11 is a transmission constituting a part of the power transfer path between the engine 2 and the transfer 12.

FIG. 4 is a diagram illustrating the relationship of the combination between the AT gear stage of the stepped transmission unit 22 and the operation of an engaging device CB. In FIG. 4, a white circle indicates engagement, a white triangle indicates engagement as needed, and blank indicates disengagement. As shown in FIG. 4, for example, the stepped transmission unit 22 has four forward AT gear stages from the AT first gear stage ("1st" in FIG. 4) to the AT fourth gear stage ("4th" in FIG. 4) and a reverse AT gear stage ("R" in FIG. 4), as a plurality of the AT gear stages. The gear ratio of the AT first gear stage is the largest, and the gear ratio becomes smaller as the AT gear stage is on the higher side.

In the stepped transmission unit 22, the electronic control device 100 selectively switches the AT gear stage formed in accordance with an operation of an accelerator pedal by a driver, a vehicle speed, or the like, that is, selectively forms the AT gear stages. For example, in shift control of the stepped transmission unit 22, the shifting is executed by switching engagement of any of the engaging devices, that is, so-called clutch-to-clutch shifting is executed in which the shifting is executed by switching between engagement and disengagement of the engaging devices. In the first embodiment, for example, downshift from the AT second gear stage to the AT first gear stage is represented as a 2→1 downshift. The same applies to other upshifts and downshifts. Further, when the transfer 12 is set to the first drive state and the second drive state, which will be described later, the engaging element of the stepped transmission unit 22 is disengaged and the stepped transmission unit 22 in placed in a neutral state.

Returning to FIG. 3, the compound transmission 11 further includes a one-way clutch F0. The one-way clutch F0 is a lock mechanism capable of fixing the carrier CA0 so as not to rotate. That is, the one-way clutch F0 is a lock mechanism capable of fixing the connecting shaft 34 that is connected to the crankshaft of the engine 2 and rotates integrally with the carrier CA0 to the transmission case 110. In the one-way clutch F0, one of two members capable of rotating with respect to each other is integrally connected to the connecting shaft 34, and the other member is integrally connected to the transmission case 110. The one-way clutch F0 idles in the forward rotation direction that is the rotation direction of the engine 2 during operation, and automatically engages with the rotation direction opposite to that during operation of the engine 2. Therefore, when the one-way clutch F0 idles, the engine 2 is in a state of being able to rotate relative to the transmission case 110. On the other hand, when the one-way clutch F0 is engaged, the engine 2 is in a state of being not able to rotate relative to the transmission case 110. That is, the engine 2 is fixed to the transmission case 110 as the one-way clutch F0 is engaged. As described above, the one-way clutch F0 allows the carrier CA0 to rotate in the forward rotation direction that is the rotation direction during operation of the engine 2, and blocks the carrier CA0 from rotating in the negative rotation direction. That is, the one-way clutch F0 is a lock mechanism capable of allowing the engine 2 to rotate in the forward rotation direction and blocks the engine 2 from rotating in the negative rotation direction.

In the compound transmission 11, a continuously variable transmission in which the continuously variable transmission unit 20 and the stepped transmission unit 22 are disposed in series can be configured by the stepped transmission unit 22 in which the AT gear stages are formed and the continuously variable transmission unit 20 that is operated as the continuously variable transmission. Alternatively, the continuously variable transmission unit 20 can be caused to execute shifting in a similar manner to that of the stepped transmission. Therefore, the compound transmission 11 as a whole can be caused to execute shifting in a similar manner as that of the stepped transmission. That is, in the compound transmission 11, the stepped transmission unit 22 and the continuously variable transmission unit 20 can be controlled such that the gear stages having different gear ratios, each of which represents the value of the ratio of the engine speed to the output rotational speed, are selectively established.

Figure 5:
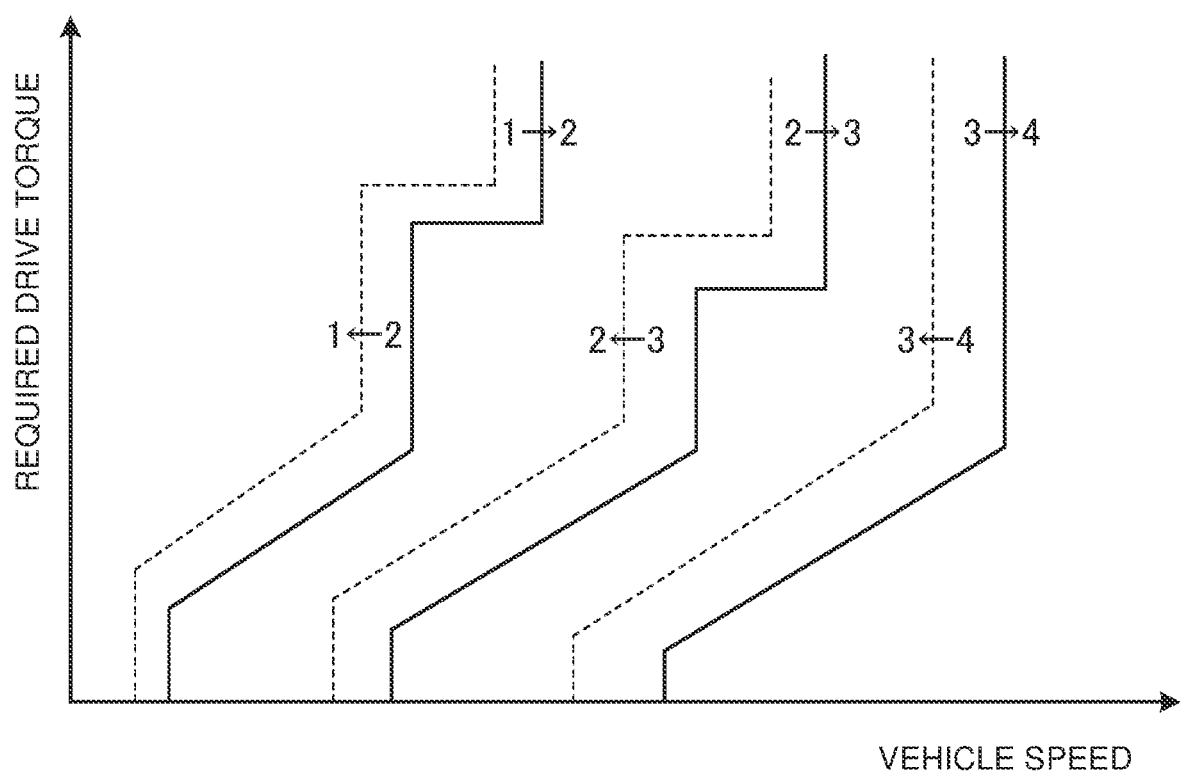
FIG. 5 is a diagram showing an example of a shift map used for shift control of the stepped transmission unit.

The electronic control device 100 executes shift determination of the stepped transmission unit 22 using an AT gear stage shift map as shown in FIG. 5 that is a predetermined relationship, for example, and executes the shift control of the stepped transmission unit 22 via the transmission control device 103 as needed. In the shift control of the stepped transmission unit 22, the transmission control device 103 outputs, to the hydraulic control circuit 111, a hydraulic control command signal for switching the engagement-disengagement state of the engaging device by each solenoid valve so as to automatically switch the AT gear stage of the stepped transmission unit 22.

The AT gear stage shift map shown in FIG. 5 has, for example, a predetermined relationship having a shift line for determining the shifting of the stepped transmission unit 22 on the two-dimensional coordinates with the required drive torque calculated based on the vehicle speed and the accelerator operation amount as variables. In the AT gear stage shift map, the output rotational speed or the like may be used instead of the vehicle speed, or the required driving force, the accelerator operation amount, the throttle valve opening, or the like may be used instead of the required drive torque. In the AT gear stage shift map shown in FIG. 5, the shift lines shown by the solid lines are each upshift line for determining the upshift, and the shift lines shown by the broken lines are each shift line for determining the downshift.

Figure 6:
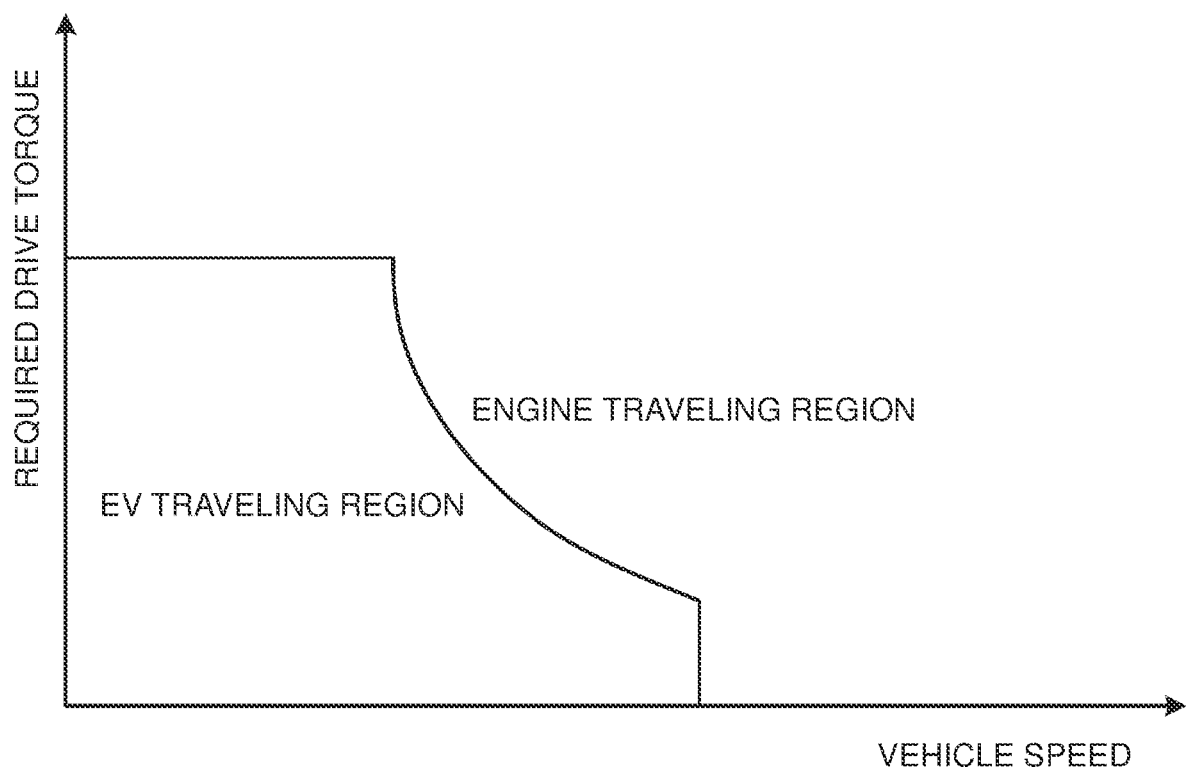
FIG. 6 is a diagram showing an example of a power source switching map used in switching control between an electronic vehicle (EV) traveling mode and an engine traveling mode.

FIG. 6 is a diagram showing an example of a power source switching map used in switching control between the EV traveling mode and the engine traveling mode. In the vehicle 1 according to the first embodiment, the EV traveling mode and the engine traveling mode are switched based on the power source switching map used in the switching control between the EV traveling mode and the engine traveling mode as shown in FIG. 6. The map shown in FIG. 6 has a predetermined relationship having a boundary between an engine traveling region in which that the vehicle travels in the engine traveling mode and an EV traveling region in which the vehicle travels in the EV traveling mode on the two-dimensional coordinates with the vehicle speed and the required drive torque as variables. The boundary between the EV traveling region and the engine traveling region in FIG. 6 is, in other words, a switching line for switching between the EV traveling mode and the engine traveling mode.

Figure 7:
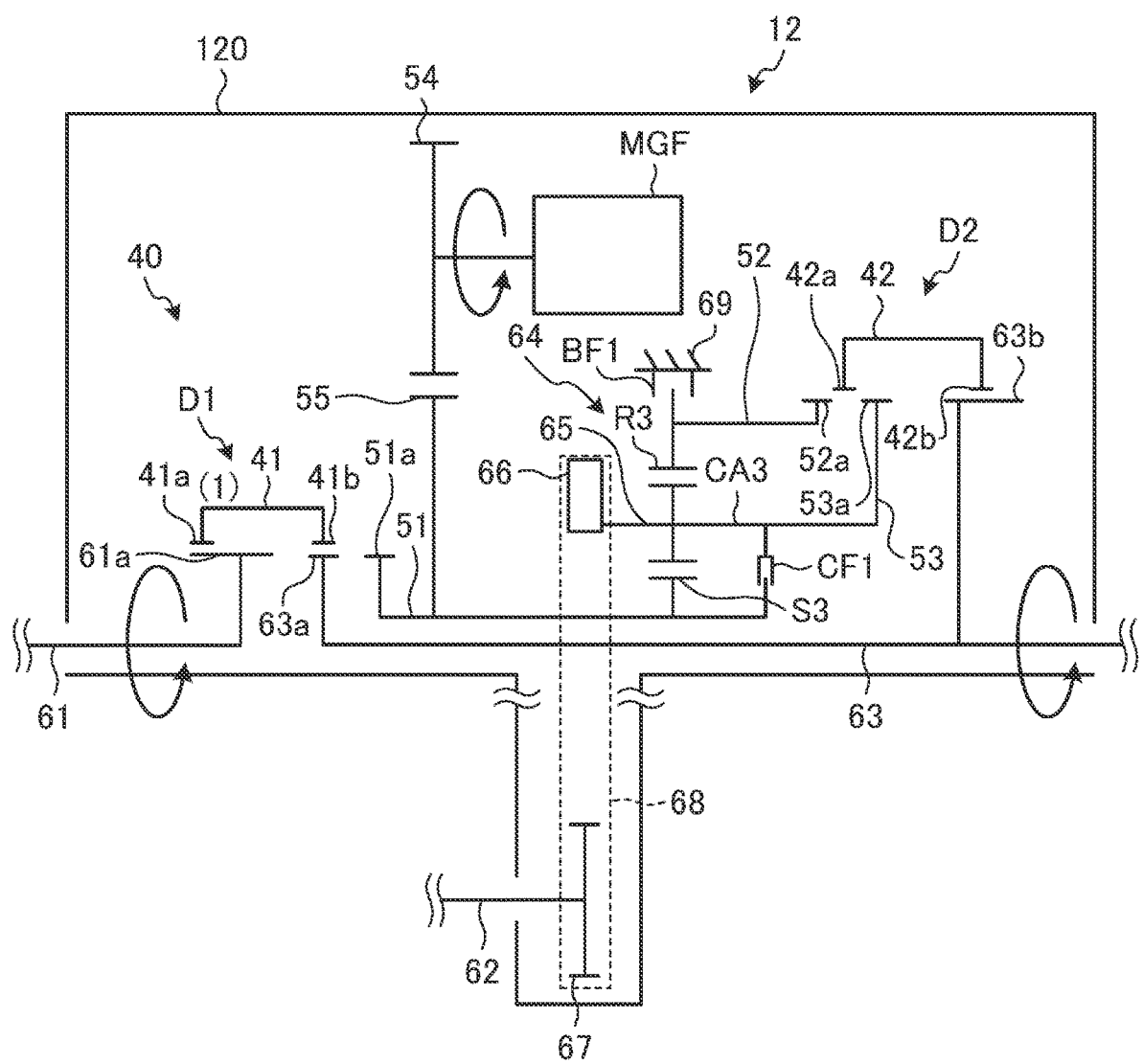
FIG. 7 is a skeleton diagram schematically showing a transfer according to the first embodiment, and is a skeleton diagram showing a case where the transfer is in a first drive state.

FIG. 7 is a skeleton diagram schematically showing the transfer 12 according to the first embodiment, and is a skeleton diagram showing a case where the transfer 12 is in a first driving state.

The transfer 12 according to the first embodiment includes a transfer case 120 that is a non-rotating member. The transfer 12 includes, in the transfer case 120, an input shaft 61, a rear wheel side output shaft 63 as a first output shaft outputting power to the rear wheels 4, a front wheel side output shaft 62 as a second output shaft outputting power to the front wheels 3, and a third planetary gear device 64 as a differential mechanism. Further, the transfer 12 includes, in the transfer case 120, a transfer member 65 that functions as an input rotating member to the front wheels 3 as a rotating member constituting a power transfer path for the front wheels 3, a drive gear 66 that outputs power to the front wheel side output shaft 62, a driven gear 67 integrally provided with the front wheel side output shaft 62, and a front wheel drive chain 68 that connects the drive gear 66 and the driven gear 67. Further, the transfer 12 includes, in the transfer case 120, the third rotating electric machine MGF that functions as a second power source, a connection switching device 40 that switches the connection state of the rotating members, a brake BF1, and a clutch CF1.

The input shaft 61 is an input rotating member that inputs power from the engine 2 (and the first rotating electric machine MG1 and the second rotating electric machine MG2) to the transfer 12. The power from the engine 2 is transferred to the input shaft 61 via the compound transmission 11. For example, the input shaft 61 is spline-fitted to the output shaft 24 that is an output rotating member of the compound transmission 11.

The rear wheel side output shaft 63 is an output rotating member that outputs power from the transfer 12 to the rear wheels 4. The rear wheel side output shaft 63 is a drive shaft disposed coaxially with the input shaft 61 and connected to the rear propeller shaft 14 (see FIG. 1).

The front wheel side output shaft 62 is an output rotating member that outputs power from the transfer 12 to the front wheels 3. The front wheel side output shaft 62 is a drive shaft disposed on a different axis from the input shaft 61 and the rear wheel side output shaft 63 and connected to the front propeller shaft 13 (see FIG. 1). The front wheel side output shaft 62 rotates via the front wheel drive chain 68 and the driven gear 67 as the drive gear 66 rotates.

The drive gear 66 is connected to the transfer member 65 so as to rotate integrally. The transfer member 65 is a rotating member that transfers power to the front wheel side output shaft 62. The transfer member 65 and the drive gear 66 are disposed so as to be rotatable relative to the rear wheel side output shaft 63. In the transfer 12, the transfer member 65, the drive gear 66, and the third planetary gear device 64 are disposed on the same rotation center as the rear wheel side output shaft 63.

The third planetary gear device 64 is configured by a single pinion type planetary gear device including three rotating elements. As shown in FIG. 7, the third planetary gear device 64 includes, as the three rotating elements, a sun gear S3, a carrier CA3 that supports a plurality of pairs of pinion gears that mesh with each other so as to be rotatable and revolvable, and a ring gear R3 that meshes with the sun gear S3 via the pinion gears. The third rotating electric machine MGF that functions as the second power source is constantly connected to the sun gear S3.

A first rotating member 51 that can be connected to the input shaft 61 is connected to the sun gear S3. The first rotating member 51 is a member that rotates integrally with the sun gear S3 and includes gear teeth 51a. Further, the first rotating member 51 is attached with an input gear 55 to which power from the third rotating electric machine MGF is input. The input gear 55 and the first rotating member 51 rotate integrally.

A third rotating member 53 that can be connected to the rear wheel side output shaft 63 is connected to the carrier CA3. The third rotating member 53 is a member that rotates integrally with the carrier CA3 and includes gear teeth 53a. Further, the transfer member 65 is connected to the carrier CA3. The transfer member 65 is a member that rotates integrally with the carrier CA3.

The second rotating member 52 that can be connected to the rear wheel side output shaft 63 is connected to the ring gear R3. The second rotating member 52 is a member that rotates integrally with the ring gear R3 and includes gear teeth 52a.

The third rotating electric machine MGF is a motor generator (MG) capable of functioning as a motor and a generator. The third rotating electric machine MGF includes a rotor, a stator, and an output shaft that rotates integrally with the rotor, and is electrically connected to the battery via an inverter. As shown in FIG. 7, an output gear 54 is provided on the output shaft of the third rotating electric machine MGF. The output gear 54 meshes with the input gear 55, and the output gear 54 and the input gear 55 constitute a reduction gear train. Therefore, when MGF torque that is the output torque from the third rotating electric machine MGF is transferred to the input gear 55, rotation of the third rotating electric machine MGF is subjected to speed change (decelerated) and transferred to the sun gear S3.

The connection switching device 40 is a device that selectively switches the connection destinations of the input shaft 61 and the rear wheel side output shaft 63. Further, the connection switching device 40 is a device for switching the connection state of the rotating members constituting the transfer 12. Specifically, the connection switching device 40 selectively switches the connection destinations of the first rotating member 51, the second rotating member 52, and the third rotating member 53 that rotate integrally with each rotating element of the third planetary gear device 64. As shown in FIG. 7, the connection switching device 40 includes a first dog clutch D1 and a second dog clutch D2.

The first dog clutch D1 is a first disconnection-connection mechanism for switching the connection destination of the input shaft 61. As shown in FIG. 7, the first dog clutch D1 selectively connects the input shaft 61 and the first rotating member 51 (sun gear S3) or the rear wheel side output shaft 63. That is, the first dog clutch D1 switches between a first input state and a second input state. In the first input state, the power from the input shaft 61 is transferred to the rear wheel side output shaft 63 without intervening the third planetary gear device 64. In the second input state, the power from the input shaft 61 is transferred to the rear wheel side output shaft 63 via the third planetary gear device 64.

The first dog clutch D1 includes a first switching sleeve 41 as a switching member. The first switching sleeve 41 includes first gear teeth 41a that mesh with gear teeth 61a of the input shaft 61 and second gear teeth 41b that mesh with first gear teeth 63a of the rear wheel side output shaft 63 or the gear teeth 51a of the first rotating member 51. The first switching sleeve 41 is moved in the axial direction by the actuator of the first dog clutch D1. The first switching sleeve 41 is switched to any of a state in which the second gear teeth 41b mesh with the first gear teeth 63a of the rear wheel side output shaft 63 while the first gear teeth 41a constantly mesh with the gear teeth 61a of the input shaft 61, a state in which the second gear teeth 41b do not mesh with any of the first gear teeth 63a of the rear wheel side output shaft 63 and the gear teeth 51a of the first rotating member 51, and a state in which the second gear teeth 41b mesh with the gear teeth 51a of the first rotating member 51. When the second gear teeth 41b of the first switching sleeve 41 mesh with the gear teeth 51a of the first rotating member 51, the input state is switched to the second input state in which the power from the input shaft 61 is input to the first rotating member 51 (sun gear S3). On the other hand, when the second gear teeth 41b of the first switching sleeve 41 mesh with the first gear teeth 63a of the rear wheel side output shaft 63, the input state is switched to the first input state in which the power from the input shaft 61 is input to the rear wheel side output shaft 63.

The second dog clutch D2 is a second disconnection-connection mechanism for switching the connection destination of the rear wheel side output shaft 63. The second dog clutch D2 selectively connects the rear wheel side output shaft 63 and the second rotating member 52 (ring gear R3) or the third rotating member 53 (carrier CA3).

The second dog clutch D2 includes a second switching sleeve 42 as a switching member. The second switching sleeve 42 includes first gear teeth 42a and second gear teeth 42b. The first gear teeth 42a of the second switching sleeve 42 can selectively mesh with the gear teeth 52a of the second rotating member 52 that rotates integrally with the ring gear R3 and the gear teeth 53a of the third rotating member 53 that rotates integrally with the carrier CA3. The second switching sleeve 42 is moved in the axial direction by the actuator of the second dog clutch D2. Then, the second switching sleeve 42 is switched to any of a state in which the first gear teeth 42a mesh with the gear teeth 52a of the second rotating member 52 while the second gear teeth 42b constantly mesh with the second gear teeth 63b of the rear wheel side output shaft 63, a state in which the first gear teeth 42a do not mesh with any of the gear teeth 52a of the second rotating member 52 and the gear teeth 53a of the third rotating member 53, and a state in which the first gear teeth 42a mesh with the gear teeth 53a of the third rotating member 53. When the first gear teeth 42a of the second switching sleeve 42 mesh with the gear teeth 52a of the second rotating member 52, the state is switched to a first transfer state in which the power is transferred between the rear wheel side output shaft 63 and the second rotating member 52 (ring gear R3). On the other hand, when the first gear teeth 42a of the second switching sleeve 42 mesh with the gear teeth 53a of the third rotating member 53, the state is switched to a second transfer state in which the power is transferred between the rear wheel side output shaft 63 and the third rotating member 53 (carrier CA3).

The brake BF1 is a first engaging element of a differential mechanism that selectively fixes the ring gear R3 of the third planetary gear device 64 to a fixing member 69. The fixing member 69 is the transfer case 120 itself or a non-rotating member integrated with the transfer case 120. The transfer 12 is set to a high-speed side shift stage Hi when the brake BF1 is disengaged, and is set to a low-speed side shift stage Lo when the brake BF1 is engaged.

The clutch CF1 is a second engaging element of a differential mechanism that selectively engages the sun gear S3 and the carrier CA3 of the third planetary gear device 64 and integrally rotates the sun gear S3, the carrier CA3, and the ring gear R3.

Figure 8:
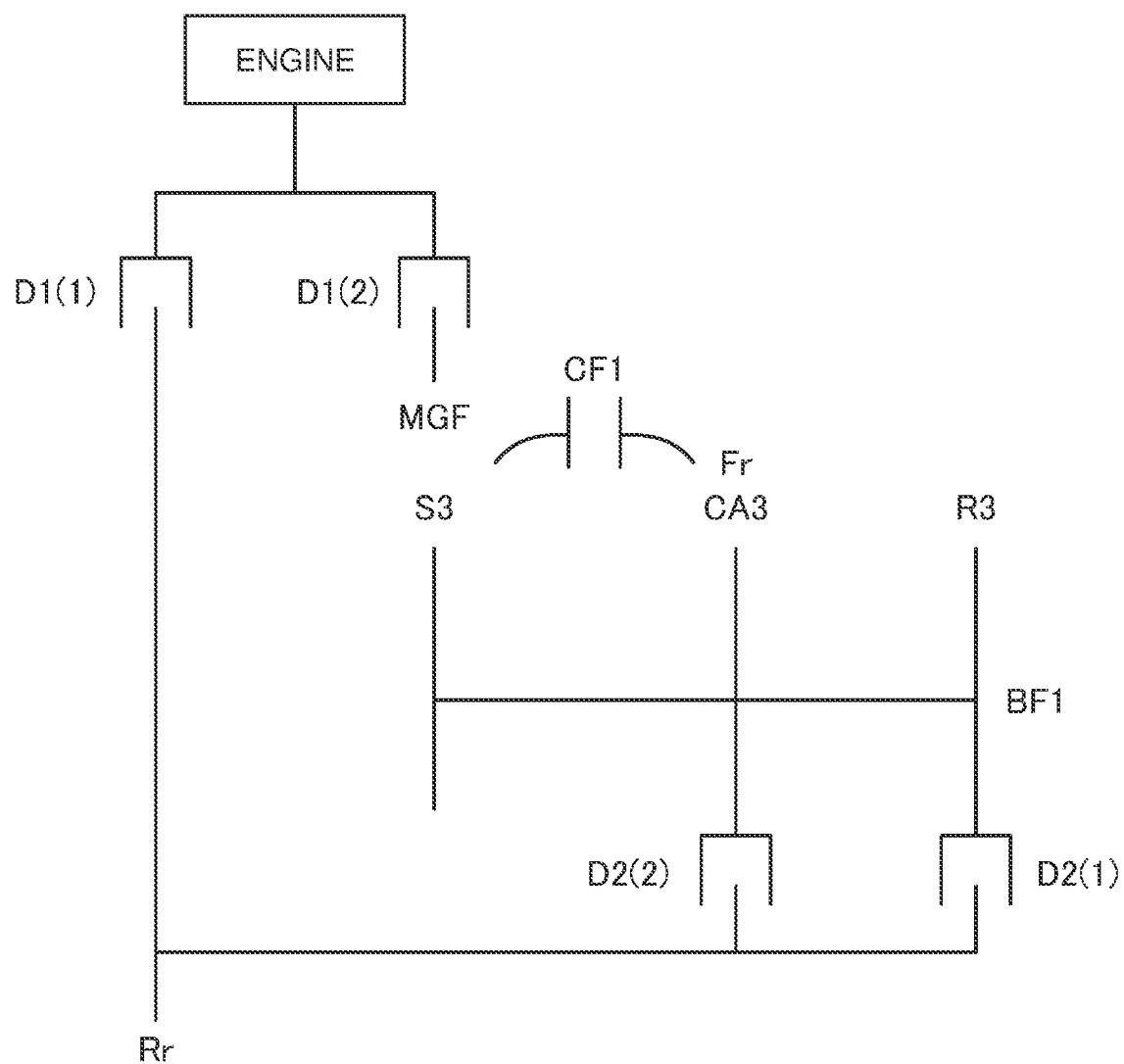
FIG. 8 is a diagram showing the engagement relationship of each rotating member in the transfer according to the first embodiment.

FIG. 8 is a diagram showing the engagement relationship of each rotating member in the transfer 12 according to the first embodiment. In FIG. 8, the third rotating electric machine MGF is referred to as "MGF", the sun gear S3 is "S3", the carrier CA3 is "CA3", the ring gear R3 is "R3", the brake BF1 is "BF1", the clutch CF1 is "CH", the front wheel side output shaft 62 is "Fr", and the rear wheel side output shaft 63 is "Rr". Further, in FIG. 8, D1 (1) indicates the connection location of the first dog clutch D1 in the first input state, and D1 (2) indicates the connection location of the first dog clutch D1 in the second input state. Further, in FIG. 8, D2 (1) shows the connection point of the second dog clutch D2 in the first transfer state, and D2 (2) shows the connection point of the second dog clutch D2 in the second transfer state.

The transfer 12 according to the first embodiment includes the rear wheel side output shaft 63, the front wheel side output shaft 62, and the third planetary gear device 64. The rear wheel side output shaft 63 is the first output shaft that is connected to the engine 2 (and the first rotating electric machine MG1 and the second rotating electric machine MG2) as the first power source and outputs the power to the rear wheels 4 that are one of the front wheels 3 and the rear wheels 4. The front wheel side output shaft 62 is the second output shaft that outputs the power to the front wheels 3 that are the other of the front wheels 3 and the rear wheels 4. The third planetary gear device 64 is the differential mechanism including the sun gear S3 that is the first rotating element, the carrier CA3 that is the second rotating element, and the ring gear R3 that is the third rotating element. Then, in the transfer 12 according to the first embodiment, in the third planetary gear device 64, the third rotating electric machine MGF that is the second power source is connected to the sun gear S3. The front wheel side output shaft 62 that is one of the front wheel side output shaft 62 and the rear wheel side output shaft 63 is connected to the carrier CA3. The rear wheel side output shaft 63 that is the other of the front wheel side output shaft 62 and the rear wheel side output shaft 63 is connected to the ring gear R3 by the second dog clutch D2 that is a disconnection-connection mechanism so as to be disconnectable and connectable. The ring gear R3 is selectively fixed to the fixing member 69 through engagement of the brake BF1 that is the engaging element. With this configuration, the second dog clutch D2 is placed in a connected state in which the second dog clutch D2 connects the rear wheel side output shaft 63 and the ring gear R3, whereby the vehicle 1 can travel in a four-wheel drive state using at least the power output from the engine 2. Further, the second dog clutch D2 is placed in a disconnected state in which the second dog clutch D2 disconnects the rear wheel side output shaft 63 from the ring gear R3, and the ring gear R3 is fixed to the fixing member 69 through engagement of the brake BF1, whereby the vehicle 1 can travel in a two-wheel drive state (front wheel drive state) using the power output from the third rotating electric machine MGF.

The drive state of the transfer 12 according to the first embodiment is switched by the electronic control device 100 such that a first drive state, a second drive state, a third drive state, a fourth drive state, a fifth drive state, and a sixth drive state can be set.

Here, the first drive state to the sixth drive state will be described. FIG. 9 is a diagram showing the relationship between each of the drive states of the transfer 12 and an operating state of each engaging device. In FIG. 9, a white circle indicates engagement, and blank indicates disengagement.

The first drive state shown in FIG. 7 is a drive state in the EV traveling mode in which the vehicle 1 travels using the power from the third rotating electric machine MGF in the EV(FF)_Hi mode, and also in the two-wheel drive state in which the power from the third rotating electric machine MGF is transferred only to the front wheels 3. In the first drive state, the transfer 12 is set to the high-speed side shift stage Hi.

When the transfer 12 is in the first drive state, as shown in FIG. 9, the brake BF1 is disengaged, the clutch CF1 is engaged, the first dog clutch D1 is in the first input state, and the second dog clutch D2 is disengaged. Note that, (1) in the first dog clutch D1 in FIG. 7 indicates that the first dog clutch D1 is in the first input state. In the first drive state, the third planetary gear device 64 is in a direct connection state in which the sun gear S3 and the carrier CA3 are connected by the clutch CF1. In the first drive state, when the power from the third rotating electric machine MGF is transferred to the front wheel side output shaft 62, the rotation of the third rotating electric machine MGF is transferred to the front wheel side output shaft 62 without speed change by the third planetary gear device 64.

Figure 10:
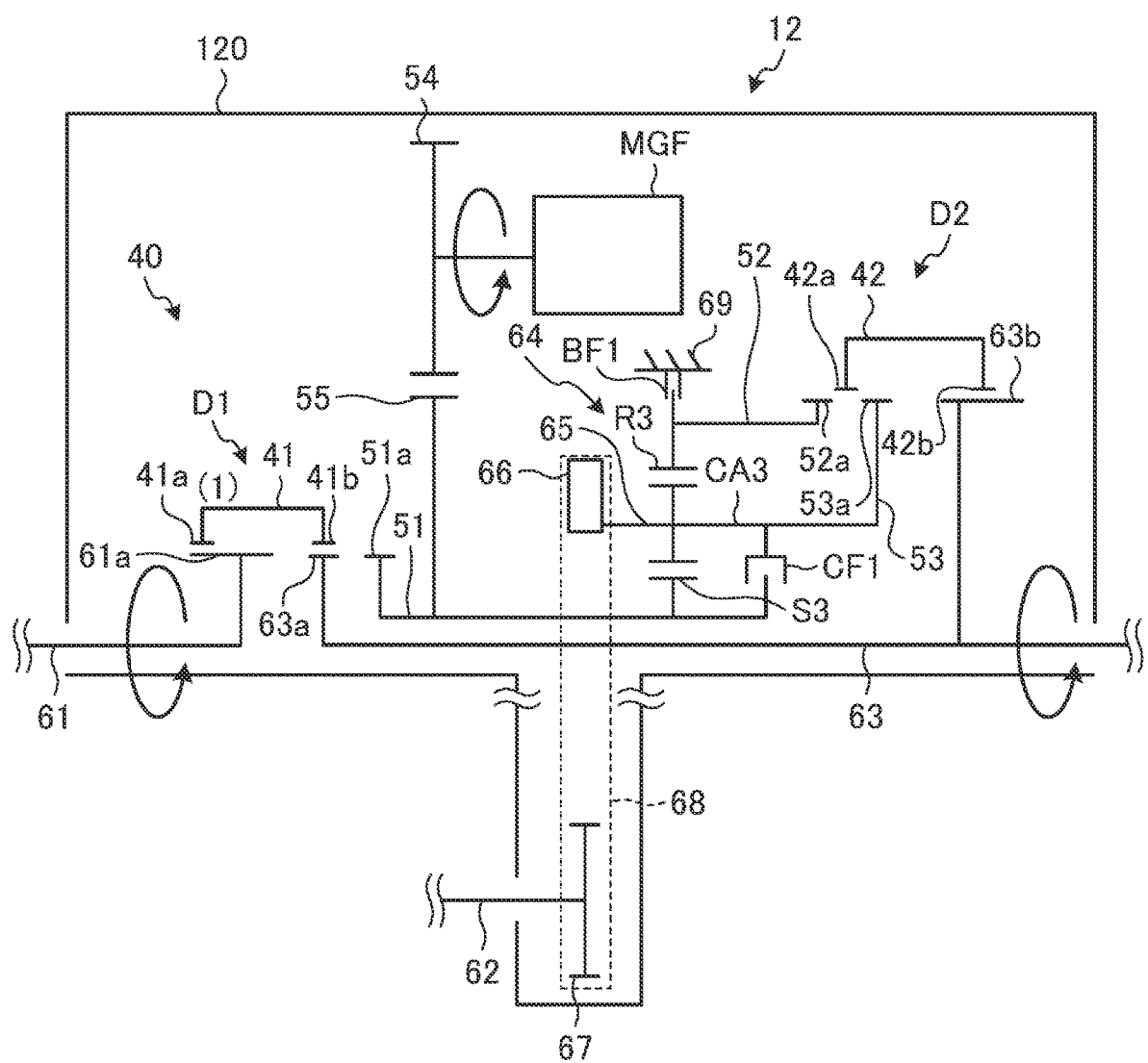
FIG. 10 is a skeleton diagram showing a case where the transfer according to the first embodiment is in a second drive state.

FIG. 10 is a skeleton diagram showing a case where the transfer 12 according to the first embodiment is in the second drive state. The second drive state is a drive state in the EV traveling mode in which the vehicle 1 travels using the power from the third rotating electric machine MGF in the EV(FF)_Lo mode, and also in the two-wheel drive state in which the power from the third rotating electric machine MGF is transferred only to the front wheels 3. In the second drive state, the transfer 12 is set to the low-speed side shift stage Lo.

When the transfer 12 is in the second drive state, as shown in FIG. 9, the brake BF1 is engaged, the clutch CF1 is disengaged, the first dog clutch D1 is in the first input state, and the second dog clutch D2 is disengaged. Note that, (1) in the first dog clutch D1 in FIG. 10 indicates that the first dog clutch D1 is in the first input state. In the second drive state, the third planetary gear device 64 is in a speed reduction state in which the ring gear R3 is mechanically fixed to the fixing member 69 by the brake BF1. In the second drive state, when the power from the third rotating electric machine MGF is transferred to the front wheel side output shaft 62, the rotation of the third rotating electric machine MGF is transferred to the front wheel side output shaft 62 after speed reduction by the third planetary gear device 64.

Figure 11:
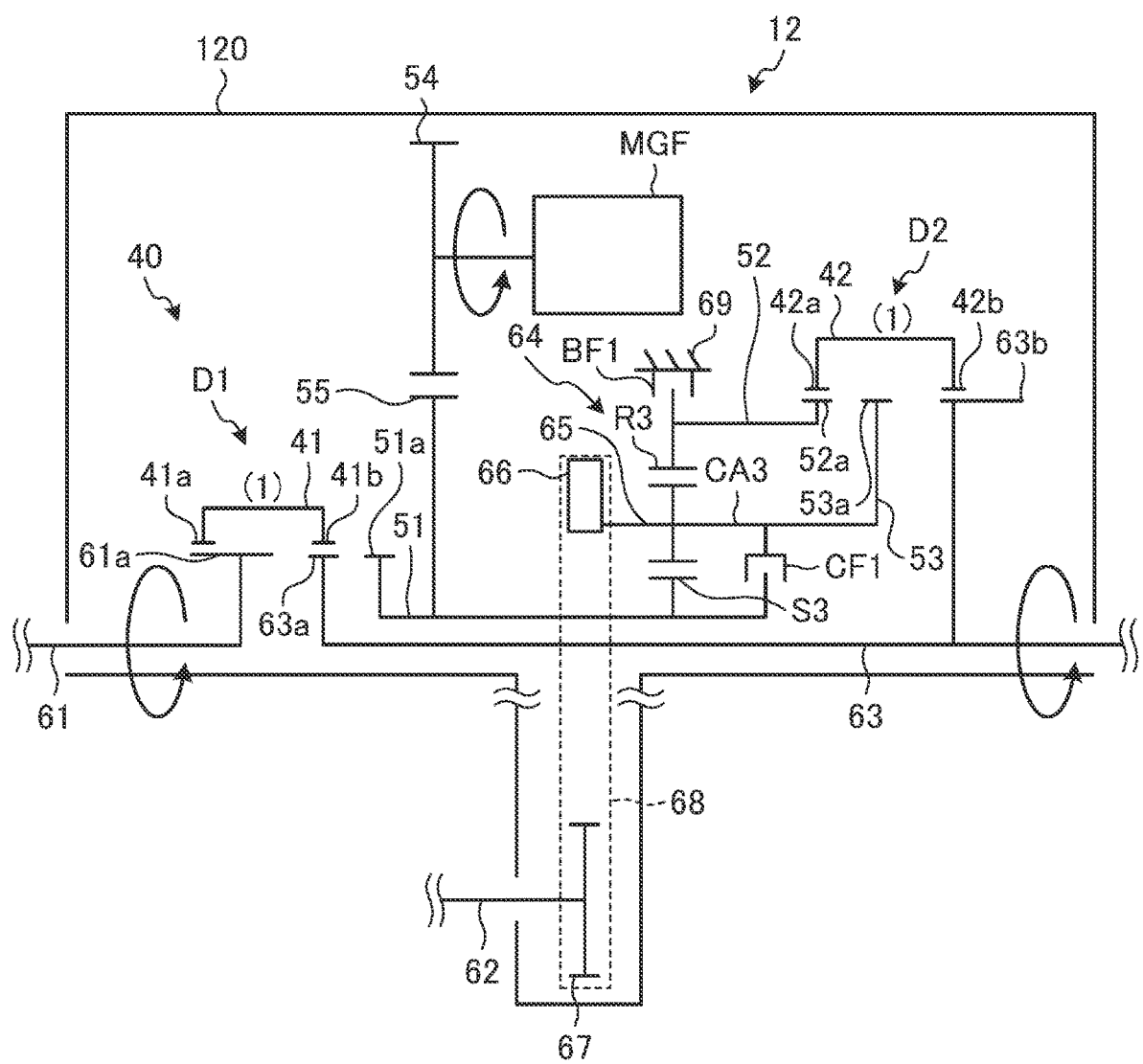
FIG. 11 is a skeleton diagram showing a case where the transfer according to the first embodiment is in a third drive state.

FIG. 11 is a skeleton diagram showing a case where the transfer 12 according to the first embodiment is in the third drive state. The third drive state is a drive state in a mode in which the power transferred to the transfer 12 in the H4_torque split mode is distributed to the front wheel 3 side and the rear wheel 4 side to cause the vehicle 1 to travel, and is also in the four-wheel drive state in which the power is transferred to the front wheels 3 and the rear wheels 4. In the third drive state, the torque distribution ratio at which the torque from the input shaft 61 is distributed to the front wheel side output shaft 62 and the rear wheel side output shaft 63 can be changed with the MGF torque from the third rotating electric machine MGF. In other words, the sun gear S3 of the third planetary gear device 64 receives the torque transferred from the rear wheel side output shaft 63 to the ring gear R3 of the third planetary gear device 64 with the MGF torque from the third rotating electric machine MGF as a reaction force such that the torque transferred to the ring gear R3 is distributed to the front wheel 3 side and the rear wheel 4 side at an arbitrary ratio. In the third drive state, the transfer 12 is set to the high-speed side shift stage Hi.

When the transfer 12 is in the third drive state, as shown in FIG. 9, the brake BF1 is disengaged, the clutch CF1 is disengaged, the first dog clutch D1 is in the first input state, and the second dog clutch D2 is in the first transfer state. Note that, (1) in the first dog clutch D1 in FIG. 11 indicates that the first dog clutch D1 is in the first input state. Further, (1) in the second dog clutch D2 in FIG. 11 indicates that the second dog clutch D2 is in the first transfer state.

Figure 12:
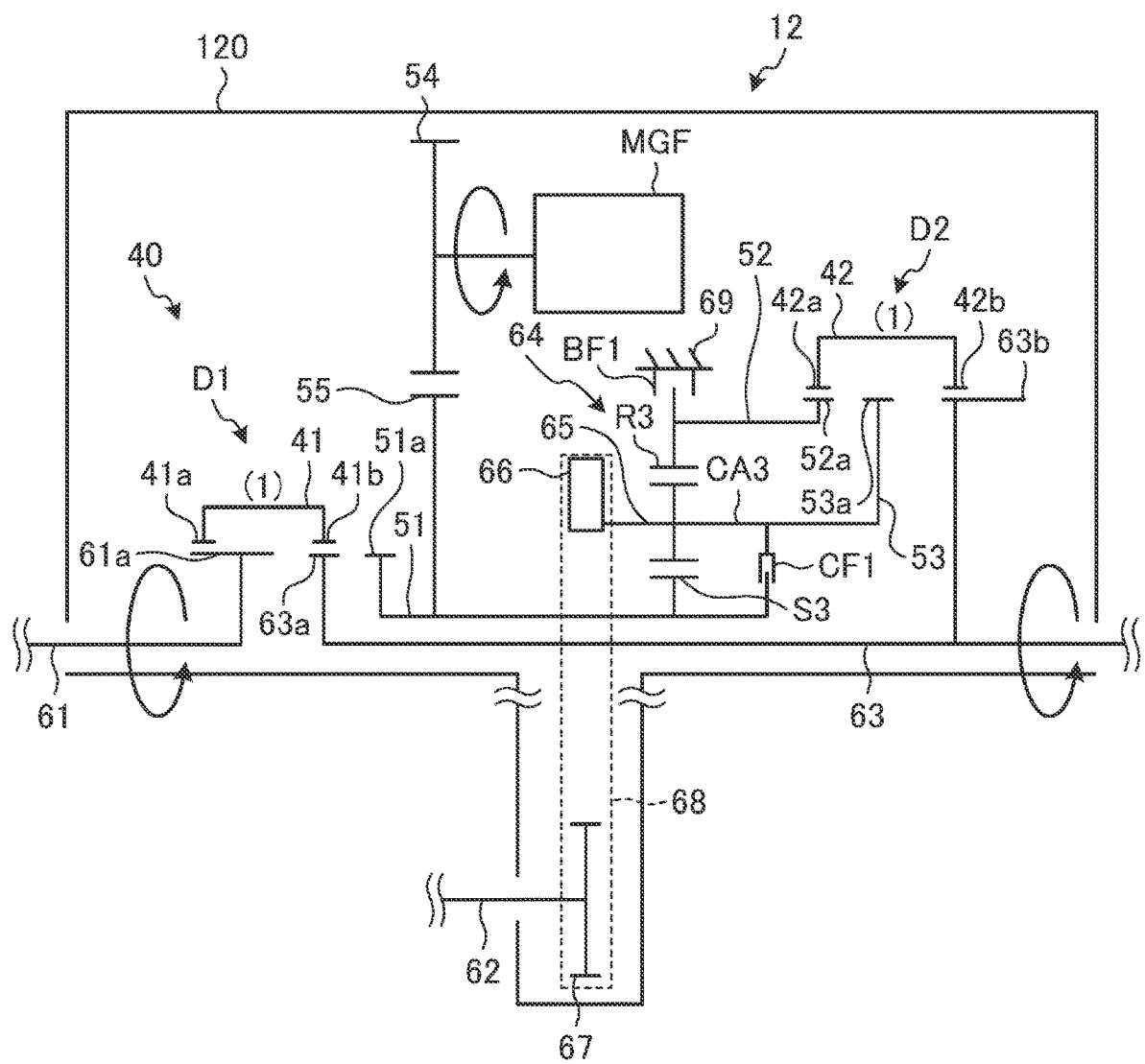
FIG. 12 is a skeleton diagram showing a case where the transfer according to the first embodiment is in a fourth drive state.

FIG. 12 is a skeleton diagram showing a case where the transfer 12 according to the first embodiment is in the fourth drive state. The fourth drive state is a drive state in a mode in which the power transferred to the transfer 12 in the H4_LSD mode is distributed to the front wheel 3 side and the rear wheel 4 side to cause the vehicle 1 to travel, and is also in the four-wheel drive state in which the power is transferred to the front wheels 3 and the rear wheels 4. The fourth drive state is a drive state in which the rotational differential between the front wheel side output shaft 62 and the rear wheel side output shaft 63 is restricted by the engagement control of the clutch CF1. In the fourth drive state, the torque distribution ratio at which the torque from the input shaft 61 is distributed to the front wheel side output shaft 62 and the rear wheel side output shaft 63 is changed by the engagement control of the clutch CF1. Note that, in the fourth drive state, the transfer 12 is set to the high-speed side shift stage Hi.

When the transfer 12 is in the fourth drive state, as shown in FIG. 9, the brake BF1 is disengaged, the clutch CF1 is under the engagement control (half engaged), the first dog clutch D1 is in the first input state, and the second dog clutch D2 is in the first transfer state. Note that, (1) in the first dog clutch D1 in FIG. 12 indicates that the first dog clutch D1 is in the first input state. Further, (1) in the second dog clutch D2 in FIG. 12 indicates that the second dog clutch D2 is in the first transfer state.

Figure 13:
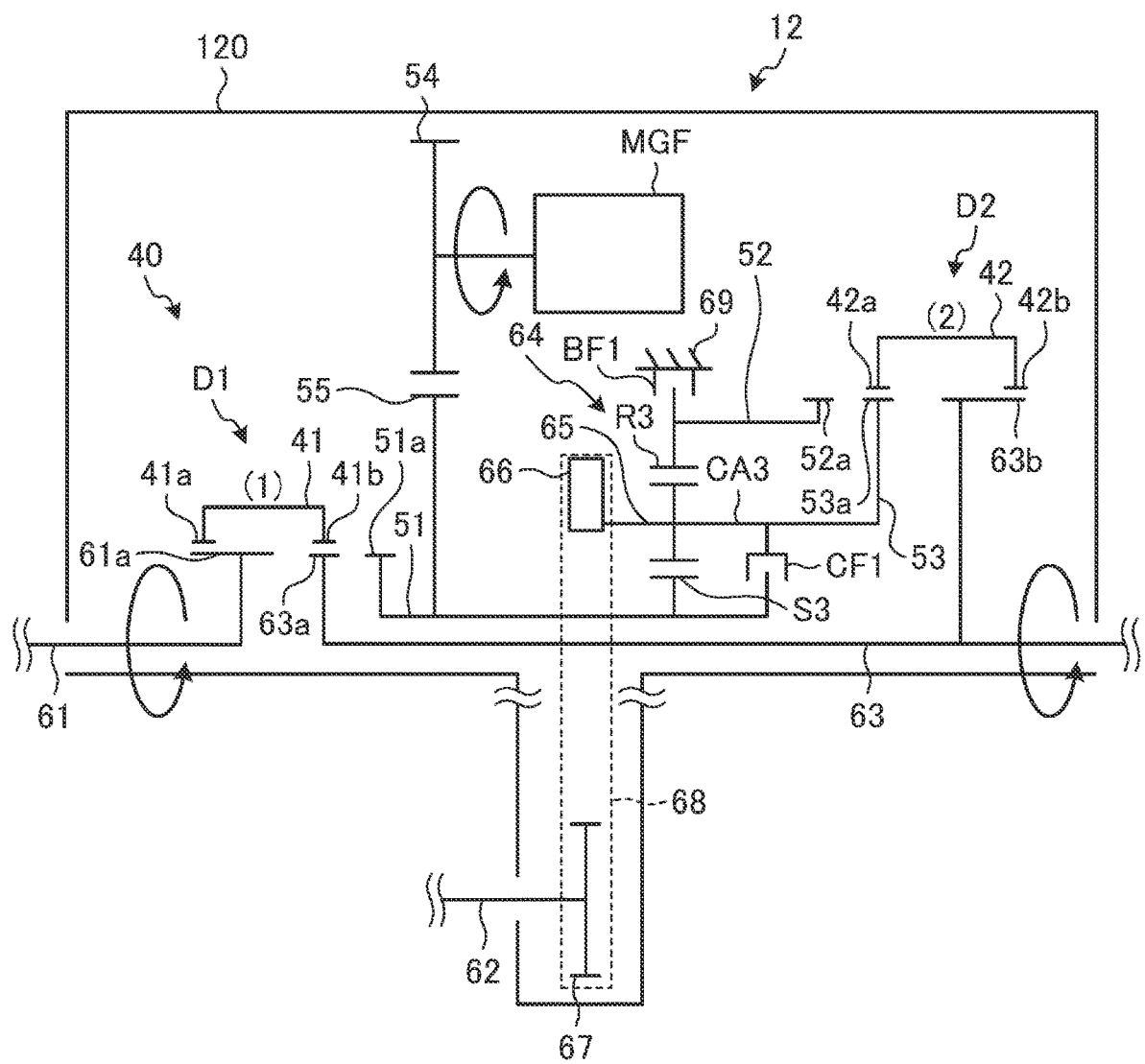
FIG. 13 is a skeleton diagram showing a case where the transfer according to the first embodiment is in a fifth drive state.

FIG. 13 is a skeleton diagram showing a case where the transfer 12 according to the first embodiment is in the fifth drive state. The fifth drive state is a drive state in a mode in which the power transferred to the transfer 12 in the H4_Lock mode (fixed distribution 4WD) is distributed to the front wheel 3 side and the rear wheel 4 side to cause the vehicle 1 to travel, and is also in a four-wheel drive state in which the power is transferred to the front wheels 3 and the rear wheels 4. The fifth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. Note that, in the fifth drive state, the transfer 12 is set to the high-speed side shift stage Hi.

When the transfer 12 is in the fifth drive state, as shown in FIG. 9, the brake BF1 is disengaged, the clutch CF1 is disengaged, the first dog clutch D1 is in the first input state, and the second dog clutch D2 is in the second transfer state. Note that, (1) in the first dog clutch D1 in FIG. 13 indicates that the first dog clutch D1 is in the first input state. Further, (2) in the second dog clutch D2 in FIG. 13 indicates that the second dog clutch D2 is in the second transfer state.

Figure 14:
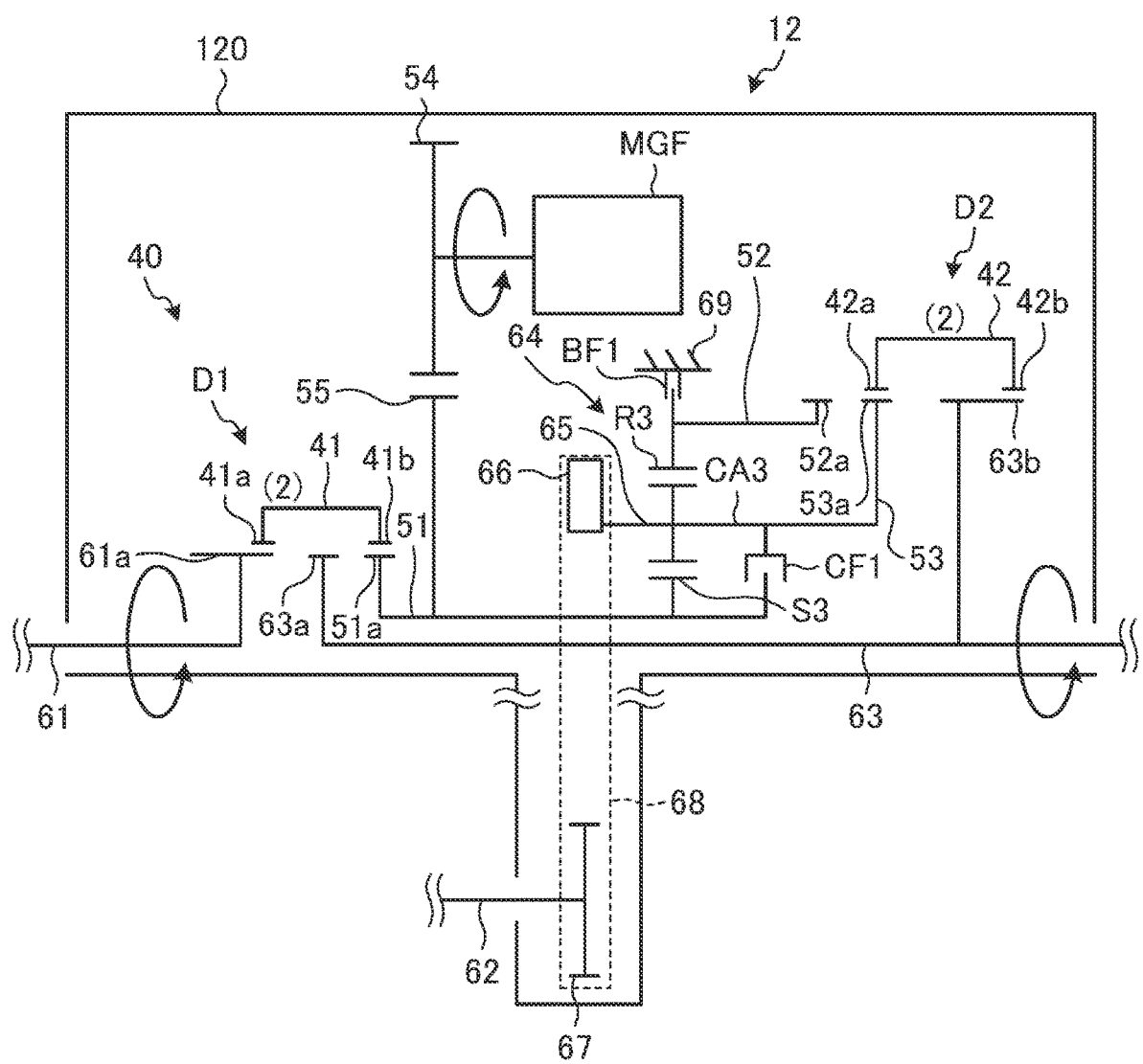
FIG. 14 is a skeleton diagram showing a case where the transfer according to the first embodiment is in a sixth drive state.

FIG. 14 is a skeleton diagram showing a case where the transfer 12 according to the first embodiment is in the sixth drive state. The sixth drive state is a drive state in a mode in which the power transferred to the transfer 12 in the L4_Lock mode (fixed distribution 4WD) is distributed to the front wheel 3 side and the rear wheel 4 side to cause the vehicle 1 to travel, and is also in the four-wheel drive state in which the power is transferred to the front wheels 3 and the rear wheels 4. The sixth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. In the sixth drive state, the transfer 12 is set to the low-speed side shift stage Lo.

When the transfer 12 is in the sixth drive state, as shown in FIG. 9, the brake BF1 is engaged, the clutch CF1 is disengaged, the first dog clutch D1 is in the second input state, and the second dog clutch D2 is in the second transfer state. Note that, (2) in the first dog clutch D1 in FIG. 14 indicates that the first dog clutch D1 is in the second input state. Further, (2) in the second dog clutch D2 in FIG. 14 indicates that the second dog clutch D2 is in the second transfer state.

In the transfer 12 according to the first embodiment, the drive states can be switched between the first drive state and the second drive state, and the third drive state and the fourth drive state in accordance with the traveling state of the vehicle 1. Further, in the fifth drive state, the drive states can be switched between the fifth drive state and the third drive state and the fourth drive state as the driver turns on and off the Lock selection switch 92 provided on the vehicle 1. Further, in the sixth drive state, the drive states can be switched between the fifth drive state and the sixth drive state as the driver turns on and off the Low selection switch 90 provided on the vehicle 1 when the vehicle is stopped.

In order to switch the drive state of the transfer 12, the electronic control device 100 controls the hydraulic control circuit 111 by the transfer control device 104 based on output signals from various sensors mounted on the vehicle 1, the 4WD selection switch 86, the Low selection switch 90, and the like, and controls the operating states of the actuator that operates the first dog clutch D1 and the second dog clutch D2, the clutch CF1, and the brake BF1.

In the first embodiment, the electronic control device 100 can set, as a first traveling mode, the H4_torque split mode and the H4_LSD mode in which the power output from the engine 2 is transferred to the front wheel side output shaft 62 via the third planetary gear device 64 in addition to the rear wheel side output shaft 63 so as to cause the vehicle 1 to travel in the four-wheel drive state when the second dog clutch D2 is in the connected state (first transfer state) in which the second dog clutch D2 connects the ring gear R3 of the third planetary gear device 64 and the rear wheel side output shaft 63. Further, in the electronic control device 100 can set, as a second traveling mode, the EV(FF)_Lo mode in which the second dog clutch D2 is placed in the disconnected state (disengaged state) in which the second dog clutch D2 disconnects the ring gear R3 of the third planetary gear device 64 from the rear wheel side output shaft 63, the brake BF1 that fixes the ring gear R3 to the fixing member 69 is engaged, and the power output from the third rotating electric machine MGF is transferred to the front wheel side output shaft 62 so as to cause the vehicle 1 to travel in the two-wheel drive state.

Then, when the second traveling mode is switched to the first traveling mode, the electronic control device 100 disengages the brake BF1 and executes synchronous control in which the number of rotations (rotational speed) of the rear wheel side output shaft 63 is synchronized with that of the ring gear R3 by the clutch CF1. The electronic control device 100 then switches the second dog clutch D2 from the disconnected state (disengaged state) to a connected state (first transfer state) in which the second dog clutch D2 connects the ring gear R3 and the rear wheel side output shaft 63. With this configuration, when the second traveling mode is switched to the first traveling mode, the rear wheel side output shaft 63 and the ring gear R3 can be appropriately connected by the second dog clutch D2.

Further, in the first embodiment, the electronic control device 100 may cause the third rotating electric machine MGF to output power even under the synchronous control, in addition to the case where the second traveling mode is set. With this configuration, the two-wheel drive state using the power output from the second power source can be set even under the synchronous control.

Figure 15:
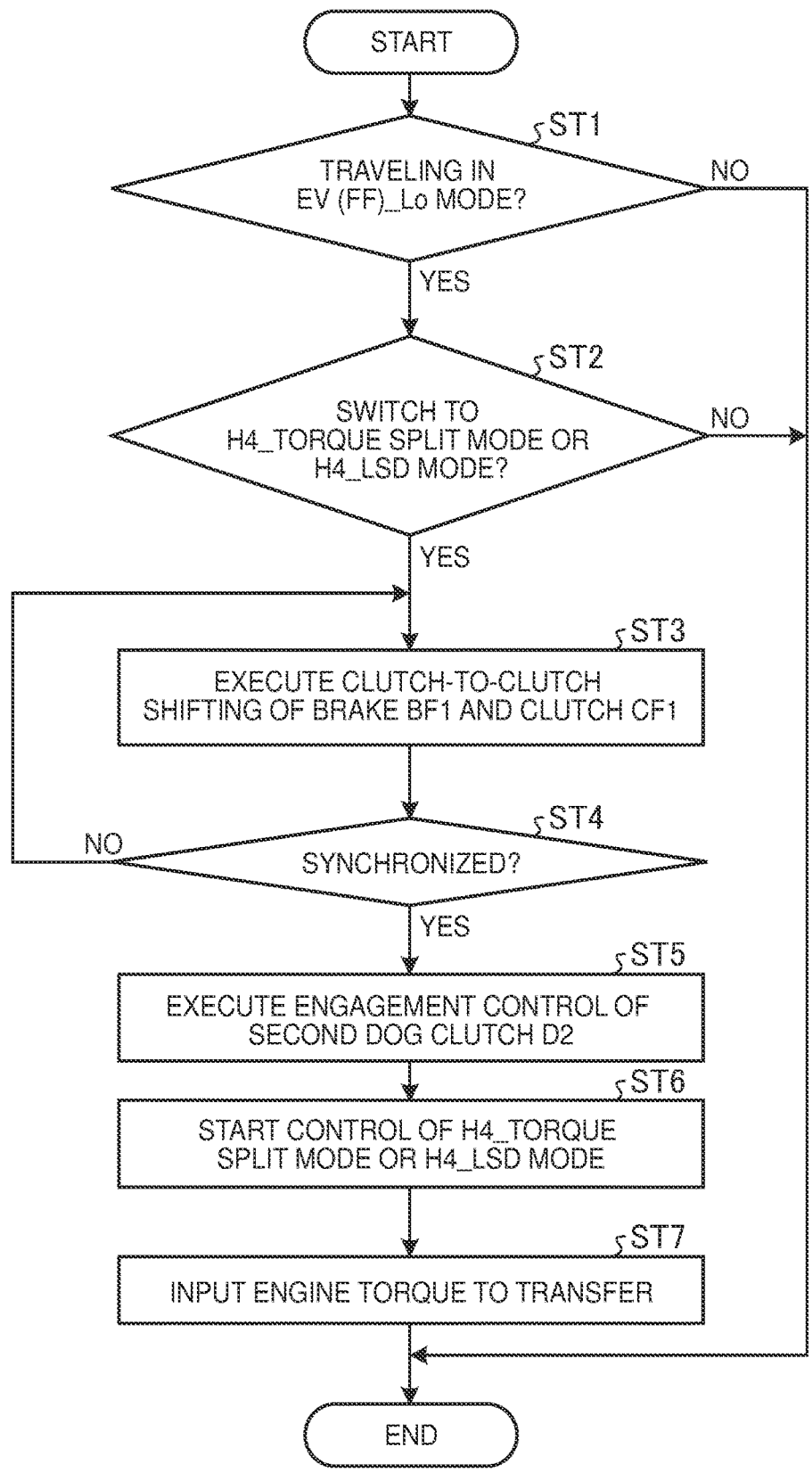
FIG. 15 is a flowchart showing an example of switching control from the EV(FF)_Lo mode to the H4_torque split mode or the H4_LSD mode executed by the electronic control device of the vehicle according to the first embodiment.

FIG. 15 is a flowchart showing an example of switching control from the EV(FF)_Lo mode to the H4_torque split mode or the H4_LSD mode executed by the electronic control device 100 according to the first embodiment.

Figure 16:
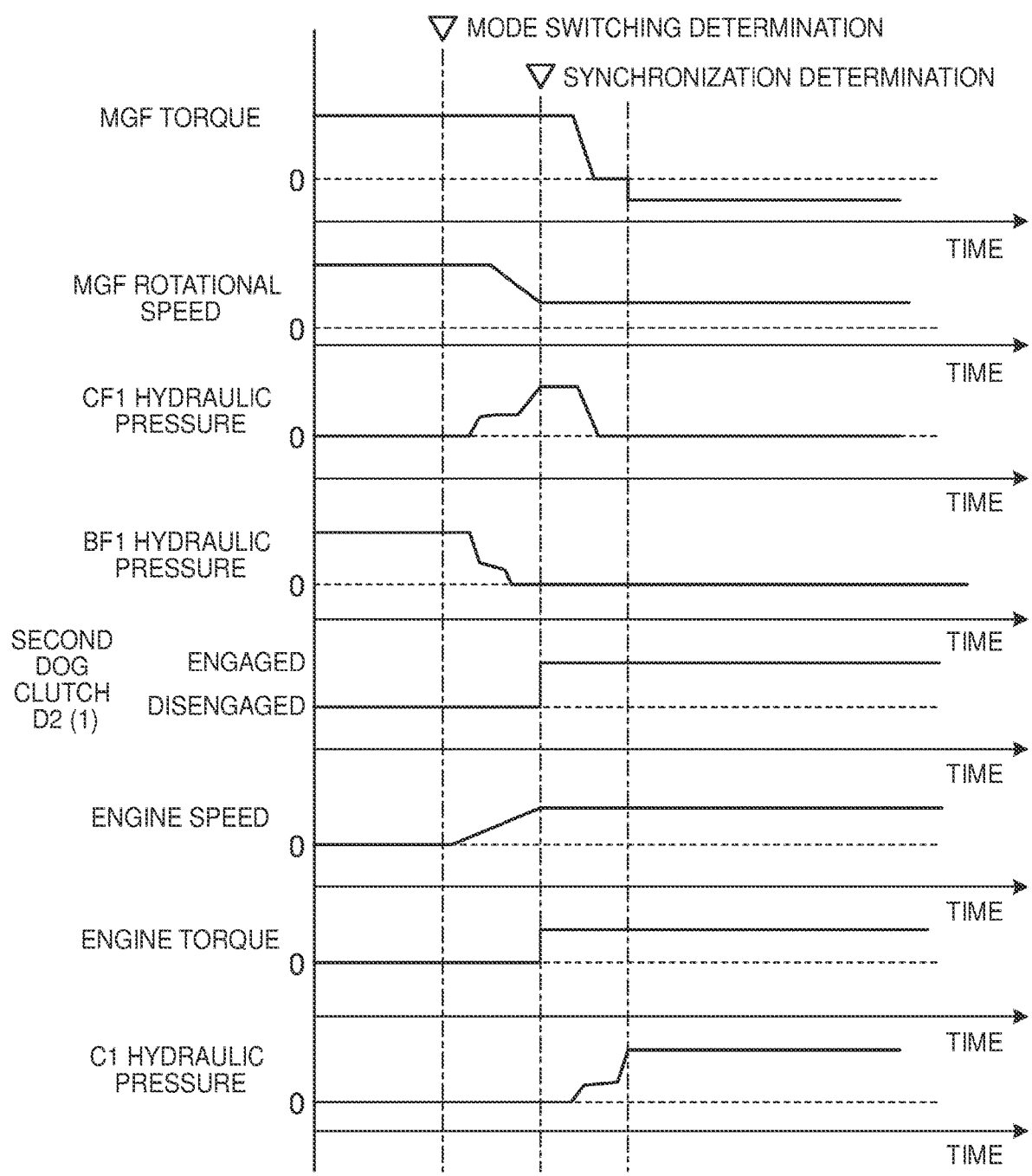
FIG. 16 is a diagram showing an example of a time chart related to the switching control when the EV(FF)_Lo mode is switched to the H4_torque split mode.

FIG. 16 is a diagram showing an example of a time chart related to the switching control when the EV(FF)_Lo mode is switched to the H4_torque split mode. In FIG. 16, the horizontal axis represents time, and the vertical axis represents each parameter (MGF torque, MGF rotational speed, CF1 hydraulic pressure, BF1 hydraulic pressure, second dog clutch D2 (1), engine speed, engine torque, and C1 hydraulic pressure). The MGF rotational speed is the rotational speed of the third rotating electric machine MGF. The CF1 hydraulic pressure is the hydraulic pressure supplied to a hydraulic actuator that operates the clutch CF1 of the transfer 12. The BF1 hydraulic pressure is the hydraulic pressure supplied to a hydraulic actuator that operates the brake BF1 of the transfer 12. The second dog clutch D2 (1) indicates switching between the engaged state and the disengaged state in which the second dog clutch D2 of the transfer 12 is in the first transfer state. The engine speed is the speed of the engine 2. The C1 hydraulic pressure is the hydraulic pressure supplied to a hydraulic actuator that operates the clutch C1 of the compound transmission 11.

First, the electronic control device 100 determines in step ST1 whether the vehicle 1 is traveling in the EV(FF)_Lo mode. When the electronic control device 100 determines that the vehicle 1 is not traveling in the EV(FF)_Lo mode (No in step ST1), the electronic control device 100 ends a series of controls. On the other hand, when the electronic control device 100 determines that the vehicle 1 is traveling in the EV(FF)_Lo mode (Yes in step ST1), the electronic control device 100 determines in step ST2 whether to switch to the H4_torque split mode or the H4_LSD mode.

When the electronic control device 100 determines not to switch to either of the H4_torque split mode or the H4_LSD mode (No in step ST2), the electronic control device 100 ends a series of controls. On the other hand, when the electronic control device 100 determines to switch to the H4_torque split mode or the H4_LSD mode (Yes in step ST2), in step ST3, the electronic control device 100 executes the clutch-to-clutch shifting of the brake BF1 and the clutch CF1 of the transfer 12 by increasing the CF1 hydraulic pressure while decreasing the BF1 hydraulic pressure. In the clutch-to-clutch shifting of the brake BF1 and the clutch CF1, the MGF torque from the third rotating electric machine MGF is still output. Further, the torque corresponding to the torque capacity of the brake BF1 or the clutch CF1 is transferred to the front wheels 3.

Next, in step ST4, the electronic control device 100 determines whether the rotational speed of the ring gear R3 of the third planetary gear device 64 has increased and the number of rotations (rotational speed) of the rear wheel side output shaft 63 has synchronized with that of the ring gear R3 by the clutch-to-clutch shifting of the brake BF1 and the clutch CF1.

When the electronic control device 100 determines that the number of rotations (rotational speed) of the rear wheel side output shaft 63 is not synchronized with that of the ring gear R3 (No in step ST4), the electronic control device 100 repeatedly executes the process in step ST3 until the numbers of rotations (rotational speeds) are synchronized with each other.

When the electronic control device 100 determines that the number of rotations (rotational speed) of the rear wheel side output shaft 63 is synchronized with that of the ring gear R3 (Yes in step ST4), the electronic control device 100 executes the engagement control of the second dog clutch D2 in step ST5. Note that, in the engagement control of the second dog clutch D2, the second dog clutch D2 is switched from the disconnected state (disengaged state) to the connected state (first transfer state) in which the second dog clutch D2 connects the ring gear R3 and the rear wheel side output shaft 63.

Next, the electronic control device 100 starts control of the H4_torque split mode or the H4_LSD mode in step ST6 after the engagement control of the second dog clutch D2 is completed. That is, when the EV(FF)_Lo mode is switched to H4_torque split mode, the electronic control device 100 starts control of the H4_torque split mode, and when the EV(FF)_Lo mode is switched to the H4_LSD mode, the electronic control device 100 starts control of the H4_LSD mode. For example, when the EV(FF)_Lo mode is switched to the H4_torque split mode, as shown in the time chart of FIG. 16, the CF1 hydraulic pressure is lowered to disengage the clutch CF1, and the sun gear S3 and the carrier CA3 of the third planetary gear device 64 are disconnected. Next, in step ST7, the electronic control device 100 inputs the engine torque to the transfer 12 and ends a series of controls. For example, although the engine 2 is started at the start of the switching control, the engine torque is not input to the transfer 12 until the clutch C1 of the compound transmission 11 is engaged so as to input the engine torque to the transfer 12 in step ST7 because the clutch C1 of the compound transmission 11 is disengaged (neutral).

As described above, when the EV(FF)_Lo mode is switched to the H4_torque split mode or the H4_LSD mode, the electronic control device 100 disengages the brake BF1 and executes synchronous control in which the number of rotations (rotational speed) of the rear wheel side output shaft 63 is synchronized with that of the ring gear R3 by the clutch CF1. The electronic control device 100 then switches the second dog clutch D2 from the disconnected state (disengaged state) to the connected state (first transfer state) in which the second dog clutch D2 connects the ring gear R3 to the rear wheel side output shaft 63. Accordingly, with the drive device 10 according to the first embodiment, when the EV(FF)_Lo mode is switched to the H4_torque split mode or the H4_LSD mode, the rear wheel side output shaft 63 and the ring gear R3 can be appropriately connected by the second dog clutch D2.

Further, the electronic control device 100 may cause the third rotating electric machine MGF to output power even under the synchronous control, in addition to the case where the second traveling mode is set. With this configuration, the two-wheel drive state using the power output from the second power source can be set even under the synchronous control.

Second Embodiment

Next, the vehicle 1 provided with the drive device 10 according to a second embodiment will be described. In the description of the second embodiment, reference signs are assigned for the same configuration as that of the first embodiment, and the description thereof will be omitted as appropriate.

Figure 17:
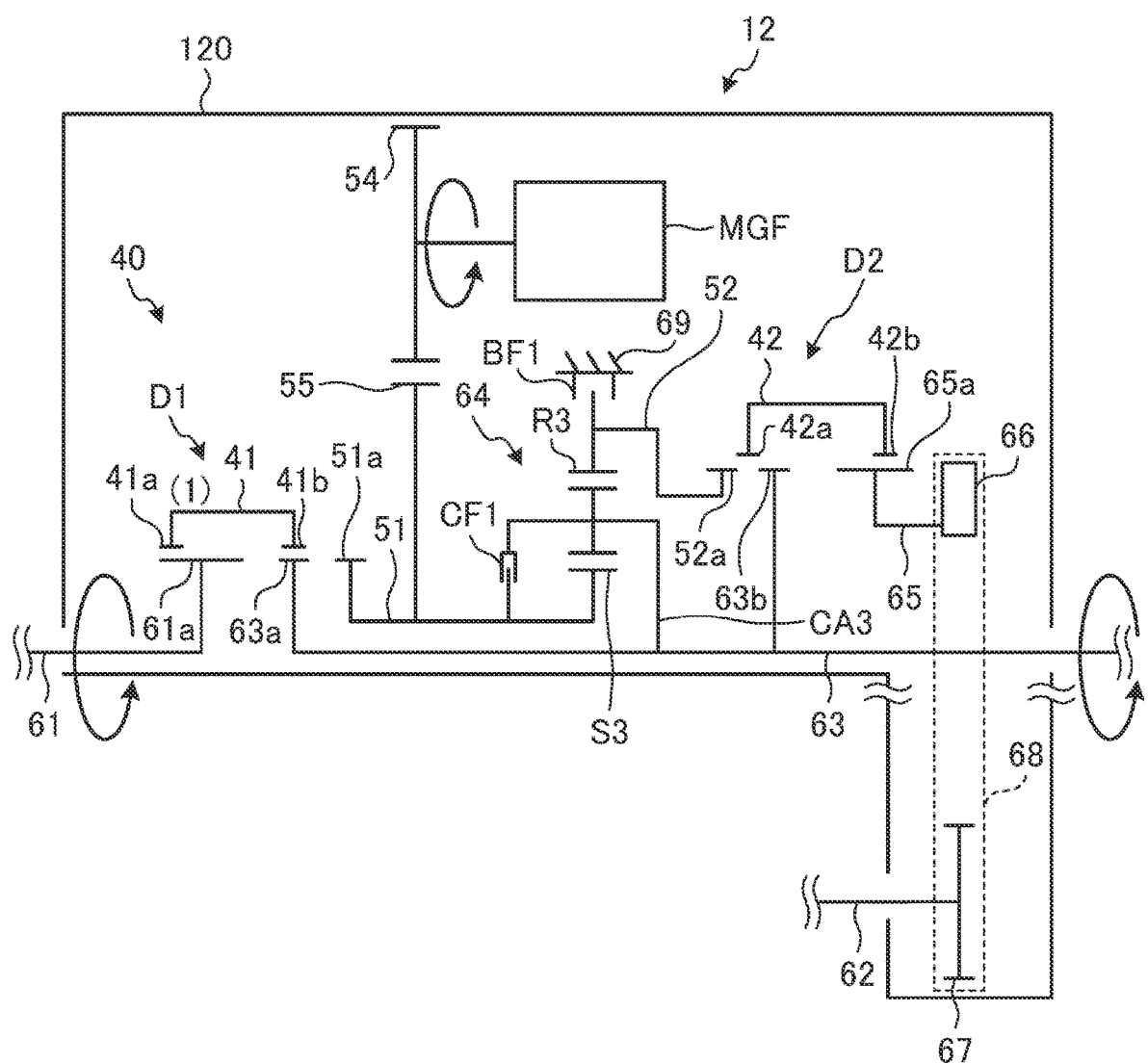
FIG. 17 is a skeleton diagram schematically showing the transfer according to the second embodiment, and is a skeleton diagram showing a case where the transfer is in the first drive state.

FIG. 17 is a skeleton diagram schematically showing the transfer 12 according to the second embodiment, and is a skeleton diagram showing a case where the transfer 12 is in the first drive state. In the transfer 12 according to the second embodiment, the carrier CA3 of the third planetary gear device 64 is constantly connected to the rear wheel side output shaft 63 so as to rotate integrally with the rear wheel side output shaft 63.

The transfer 12 includes the connection switching device 40 (first dog clutch D1 and second dog clutch D2), the brake BF1, and the clutch CF1.

The transfer 12 according to the second embodiment includes the transfer member 65 that functions as an input rotating member of power to the front wheel 3 side as a rotating member that constitutes a power transfer path on the front wheel 3 side. The transfer member 65 is connected to the drive gear 66 so as to rotate integrally. The transfer member 65 is a rotating member that transfers power to the front wheel side output shaft 62. The transfer member 65 and the drive gear 66 are disposed so as to be rotatable relative to the rear wheel side output shaft 63. In the transfer 12 according to the second embodiment, the transfer member 65, the drive gear 66, and the third planetary gear device 64 are disposed on the same rotation center as the rear wheel side output shaft 63.

The second dog clutch D2 is a second disconnection-connection mechanism for switching the connection destination of the transfer member 65. The second dog clutch D2 can selectively connect the rear wheel side output shaft 63 to the transfer member 65. That is, the second dog clutch D2 can selectively connect the transfer member 65 to the rear wheel side output shaft 63 or the second rotating member 52 (ring gear R3).

The second dog clutch D2 includes a second switching sleeve 42 as a switching member. The second switching sleeve 42 includes the first gear teeth 42a that can mesh with the gear teeth 52a of the second rotating member 52 that rotates integrally with the ring gear R3 or the second gear teeth 63b of the rear wheel side output shaft 63. Further, the second switching sleeve 42 includes the second gear teeth 42b that constantly mesh with the gear teeth 65a of the transfer member 65. The second switching sleeve 42 is moved in the axial direction by the actuator of the second dog clutch D2. The second switching sleeve 42 is switched to any of a state in which the first gear teeth 42a mesh with the gear teeth 52a of the second rotating member 52 while the second gear teeth 42b constantly mesh with the gear teeth 65a of the transfer member 65, a state in which the first gear teeth 42a do not mesh with any of the gear teeth 52a of the second rotating member 52 and the second gear teeth 63b of the rear wheel side output shaft 63, and a state in which the first gear teeth 42a mesh with the second gear teeth 63b of the rear wheel side output shaft 63. The clutch CF1 is a second engaging element of a differential mechanism that selectively connects the sun gear S3 and the carrier CA3 of the third planetary gear device 64 and integrally rotates the sun gear S3, the carrier CA3, and the ring gear R3.

The brake BF1 is a first engaging element of a differential mechanism that selectively fixes the ring gear R3 of the third planetary gear device 64 to a fixing member 69. The fixing member 69 is the transfer case 120 itself or a non-rotating member integrated with the transfer case 120. The transfer 12 is set to the high-speed side shift stage Hi when the brake BF1 is disengaged, and is set to the low-speed side shift stage Lo when the brake BF1 is engaged.

The clutch CF1 is the second engaging element of a differential mechanism that selectively engages the sun gear S3 and the carrier CA3 of the third planetary gear device 64 and integrally rotates the sun gear S3, the carrier CA3, and the ring gear R3.

Figure 18:
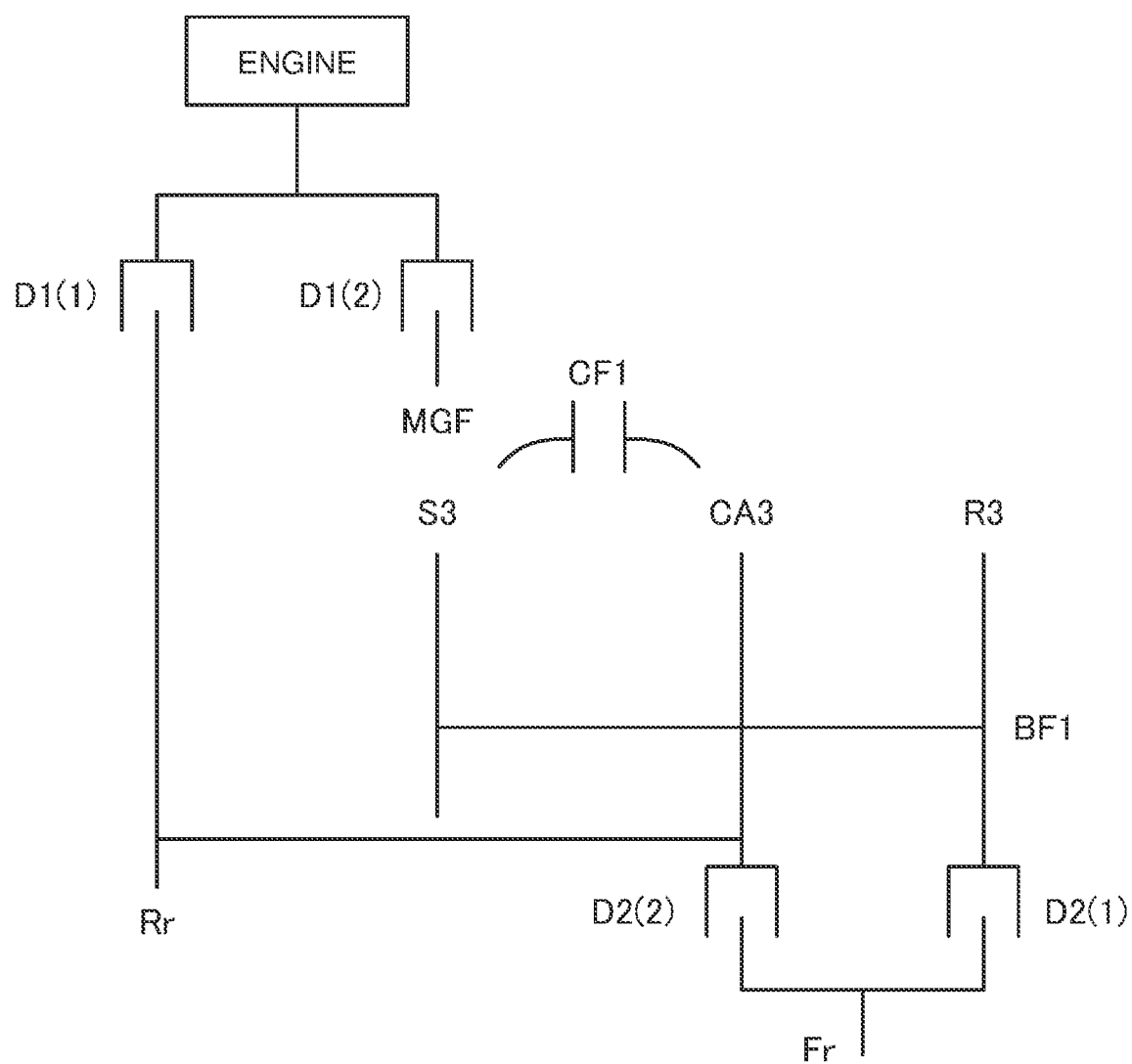
FIG. 18 is a diagram showing the engagement relationship of each rotating member in the transfer according to the second embodiment.

FIG. 18 is a diagram showing the engagement relationship of each rotating member in the transfer 12 according to the second embodiment. The transfer 12 according to the second embodiment includes the rear wheel side output shaft 63, the front wheel side output shaft 62, and the third planetary gear device 64. The rear wheel side output shaft 63 is the first output shaft that is connected to the engine 2 (and the first rotating electric machine MG1 and the second rotating electric machine MG2) as the first power source and outputs power to the rear wheels 4 that are one of the front wheels 3 and the rear wheels 4. The front wheel side output shaft 62 is the second output shaft that outputs the power to the front wheels 3 that are the other of the front wheels 3 and the rear wheels 4. The third planetary gear device 64 is the differential mechanism including the sun gear S3 that is the first rotating element, the carrier CA3 that is the second rotating element, and the ring gear R3 that is the third rotating element. Then, in the transfer 12 according to the second embodiment, in the third planetary gear device 64, the third rotating electric machine MGF that is the second power source is connected to the sun gear S3. The rear wheel side output shaft 63 that is one of the front wheel side output shaft 62 and the rear wheel side output shaft 63 is connected to the carrier CA3. The front wheel side output shaft 62 that is the other of the front wheel side output shaft 62 and the rear wheel side output shaft 63 is connected to the ring gear R3 by the second dog clutch D2 that is a disconnection-connection mechanism so as to be disconnectable and connectable. The ring gear R3 is selectively fixed to the fixing member 69 through engagement of the brake BF1 that is an engaging element. With this configuration, by placing the second dog clutch D2 in a connected state in which the second dog clutch D2 connects the front wheel side output shaft 62 and the ring gear R3, it is possible to cause the vehicle 1 to travel in the four-wheel drive state using at least the power output from the engine 2. Further, the second dog clutch D2 is placed in a disconnected state in which the second dog clutch D2 disconnects the front wheel side output shaft 62 from the ring gear R3, and the ring gear R3 is fixed to the fixing member 69 through engagement of the brake BF1, whereby the vehicle 1 can travel in the two-wheel drive state (rear wheel drive state) using the power from the third rotating electric machine MGF.

FIG. 19 is a diagram showing the relationship between each of the drive states of the transfer 12 according to the second embodiment and an operating state of each engaging device. In FIG. 19, a white circle indicates engagement, and blank indicates disengagement.

The first drive state shown in FIG. 17 is a drive state in the EV traveling mode in which the vehicle 1 travels using the power from the third rotating electric machine MGF in the EV(FR)_Hi mode, and also in the two-wheel drive state in which the power from the third rotating electric machine MGF is transferred only to the rear wheels 4. Note that, in the first drive state, the transfer 12 is set to the high-speed side shift stage Hi.

When the transfer 12 is in the first drive state, as shown in FIG. 19, the brake BF1 is disengaged, the clutch CF1 is engaged, the first dog clutch D1 is in the first input state, and the second dog clutch D2 is disengaged. Note that, (1) in the first dog clutch D1 in FIG. 17 indicates that the first dog clutch D1 is in the first input state. In the first drive state, the third planetary gear device 64 is in a direct connection state in which the sun gear S3 and the carrier CA3 are connected by the clutch CF1. In the first drive state, when the power from the third rotating electric machine MGF is transferred to the rear wheel side output shaft 63, the rotation of the third rotating electric machine MGF is transferred to the rear wheel side output shaft 63 without speed change by the third planetary gear device 64.

Figure 20:
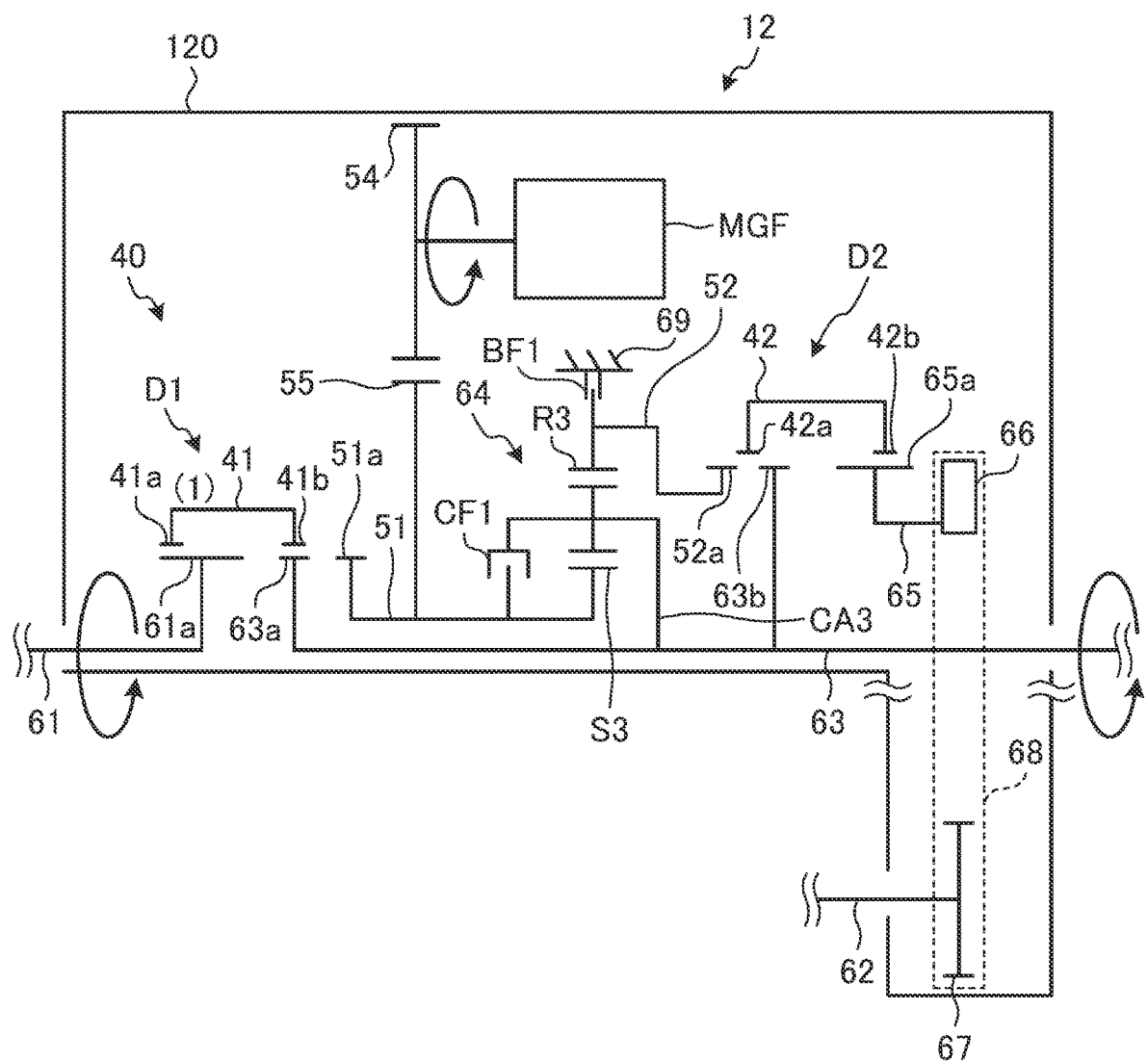
FIG. 20 is a skeleton diagram showing a case where the transfer according to the second embodiment is in the second drive state.

FIG. 20 is a skeleton diagram showing a case where the transfer 12 according to the second embodiment is in the second drive state. The second drive state is a drive state in the EV traveling mode in which the vehicle 1 travels using the power from the third rotating electric machine MGF in the EV(FR)_Lo mode, and also in the two-wheel drive state in which the power from the third rotating electric machine MGF is transferred only to the rear wheels 4. Note that, in the second drive state, the transfer 12 is set to the low-speed side shift stage Lo.

When the transfer 12 is in the second drive state, as shown in FIG. 19, the brake BF1 is engaged, the clutch CF1 is disengaged, the first dog clutch D1 is in the first input state, and the second dog clutch D2 is disengaged. Note that, (1) in the first dog clutch D1 in FIG. 20 indicates that the first dog clutch D1 is in the first input state. In the second drive state, the third planetary gear device 64 is in a speed reduction state in which the ring gear R3 is fixed to the fixing member 69 by the brake BF1. In the second drive state, when the power from the third rotating electric machine MGF is transferred to the rear wheel side output shaft 63, the rotation of the third rotating electric machine MGF is transferred to the rear wheel side output shaft 63 after speed reduction by the third planetary gear device 64.

Figure 21:
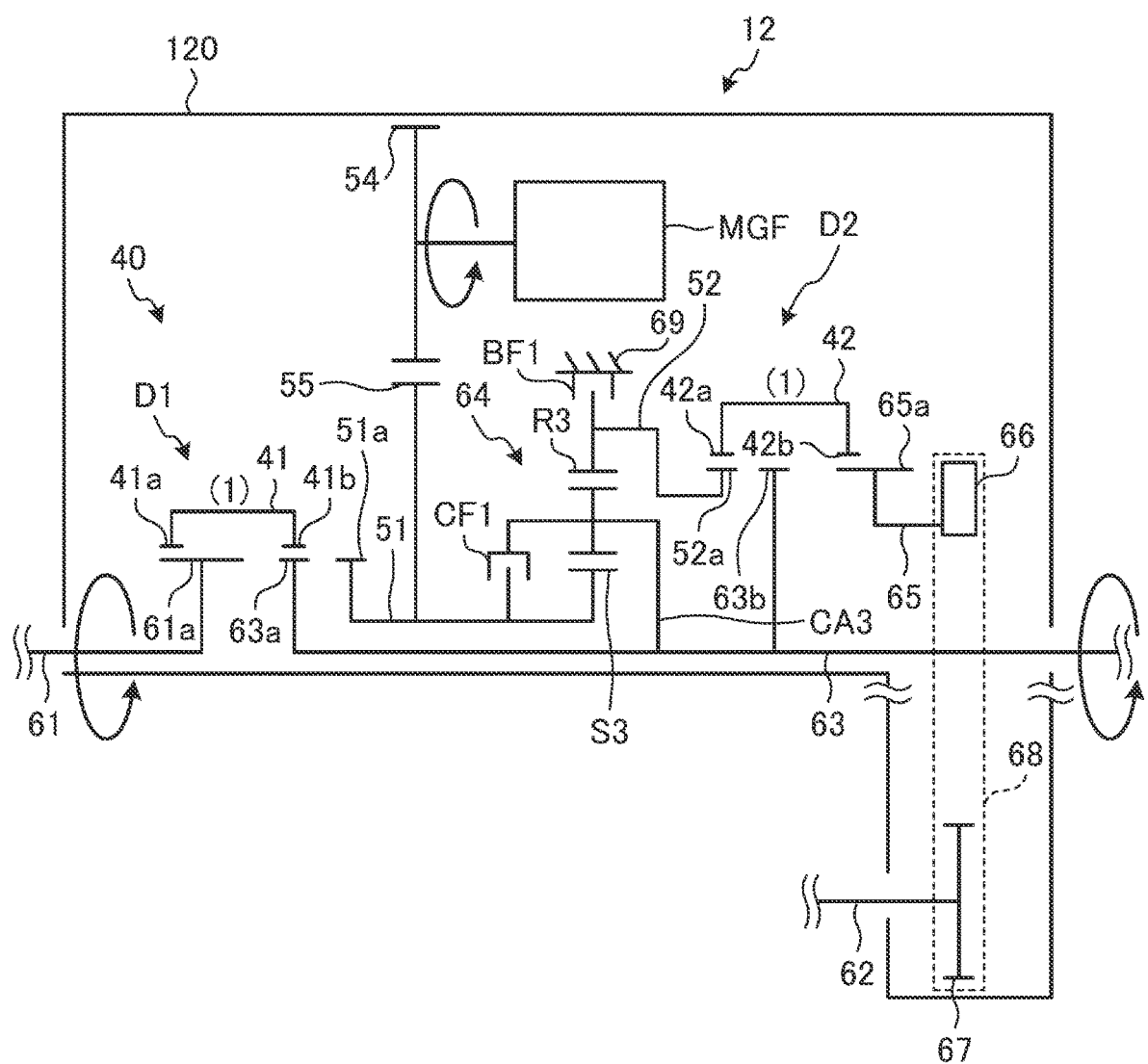
FIG. 21 is a skeleton diagram showing a case where the transfer according to the second embodiment is in the third drive state.

FIG. 21 is a skeleton diagram showing a case where the transfer 12 according to the second embodiment is in the third drive state. The third drive state is a drive state in a mode in which the power transferred to the transfer 12 in the H4_torque split mode is distributed to the front wheel 3 side and the rear wheel 4 side to cause the vehicle 1 to travel, and is also in the four-wheel drive state in which the power is transferred to the front wheels 3 and the rear wheels 4. In the third drive state, the torque distribution ratio at which the torque from the input shaft 61 is distributed to the front wheel side output shaft 62 and the rear wheel side output shaft 63 is changed with the MGF torque from the third rotating electric machine MGF. In other words, the sun gear S3 of the third planetary gear device 64 receives the power transferred from the rear wheel side output shaft 63 to the ring gear R3 of the third planetary gear device 64 with the MGF torque from the third rotating electric machine MGF as a reaction force such that the torque transferred to the ring gear R3 is distributed to the front wheel 3 side and the rear wheel 4 side at an arbitrary ratio. In the third drive state, the transfer 12 is set to the high-speed side shift stage Hi.

When the transfer 12 is in the third drive state, as shown in FIG. 19, the brake BF1 is disengaged, the clutch CF1 is disengaged, the first dog clutch D1 is in the first input state, and the second dog clutch D2 is in the first transfer state. Note that, (1) in the first dog clutch D1 in FIG. 21 indicates that the first dog clutch D1 is in the first input state. Further, (1) in the second dog clutch D2 in FIG. 21 indicates that the second dog clutch D2 is in the first transfer state.

Figure 22:
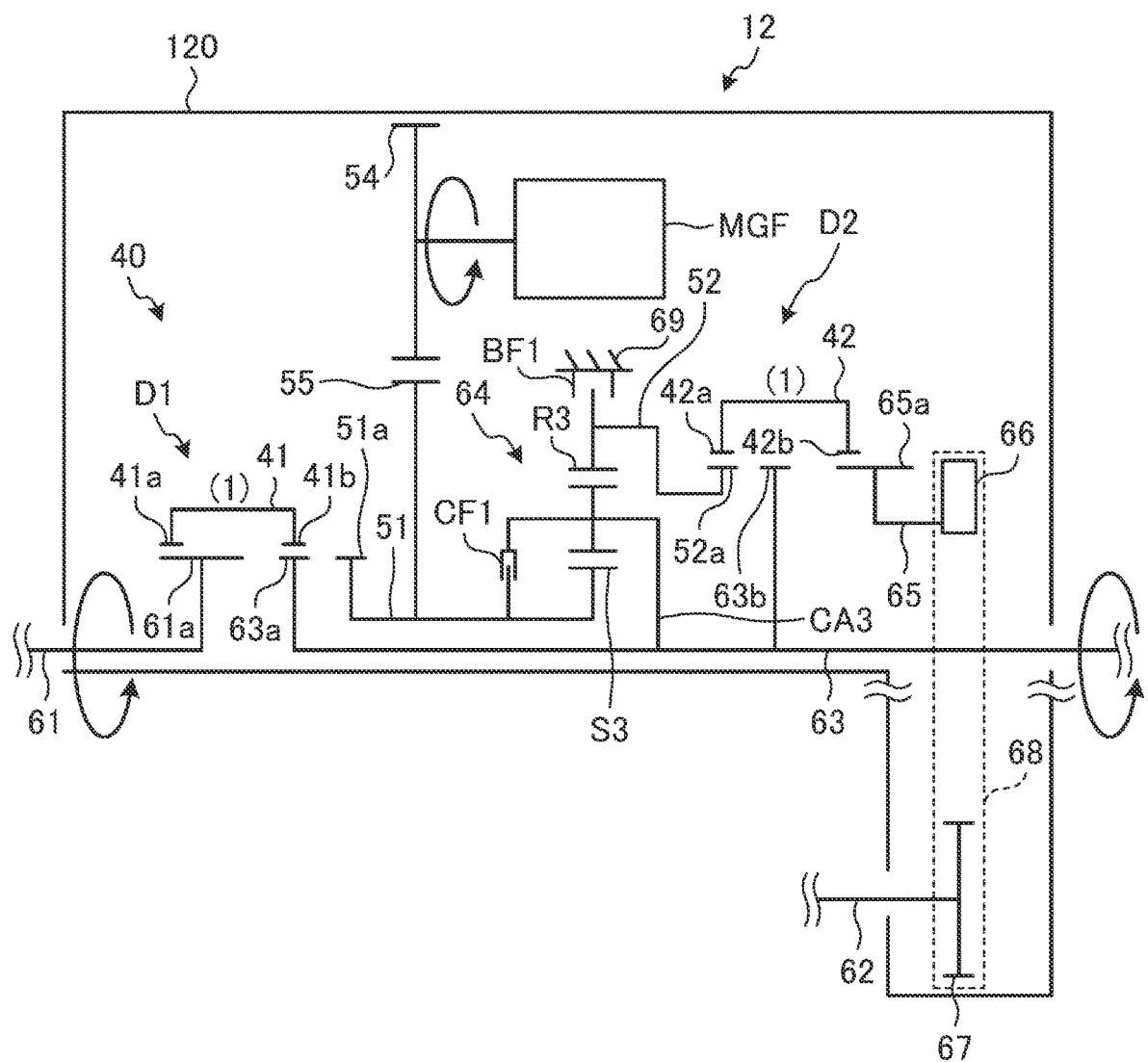
FIG. 22 is a skeleton diagram showing a case where the transfer according to the second embodiment is in the fourth drive state.

FIG. 22 is a skeleton diagram showing a case where the transfer 12 according to the second embodiment is in the fourth drive state. The fourth drive state is a drive state in a mode in which the power transferred to the transfer 12 in the H4_LSD mode is distributed to the front wheel 3 side and the rear wheel 4 side to cause the vehicle 1 to travel, and is also in the four-wheel drive state in which the power is transferred to the front wheels 3 and the rear wheels 4. The fourth drive state is a drive state in which the rotational differential between the front wheel side output shaft 62 and the rear wheel side output shaft 63 is restricted by the engagement control of the clutch CF1. In the fourth drive state, the torque distribution ratio at which the torque from the input shaft 61 is distributed to the front wheel side output shaft 62 and the rear wheel side output shaft 63 is changed by the engagement control of the clutch CF1. Note that, in the fourth drive state, the transfer 12 is set to the high-speed side shift stage Hi.

When the transfer 12 is in the fourth drive state, as shown in FIG. 19, the brake BF1 is disengaged, the clutch CF1 is under the engagement control (half engaged), the first dog clutch D1 is in the first input state, and the second dog clutch D2 is in the first transfer state. Note that, (1) in the first dog clutch D1 in FIG. 22 indicates that the first dog clutch D1 is in the first input state. Further, (1) in the second dog clutch D2 in FIG. 22 indicates that the second dog clutch D2 is in the first transfer state.

Figure 23:
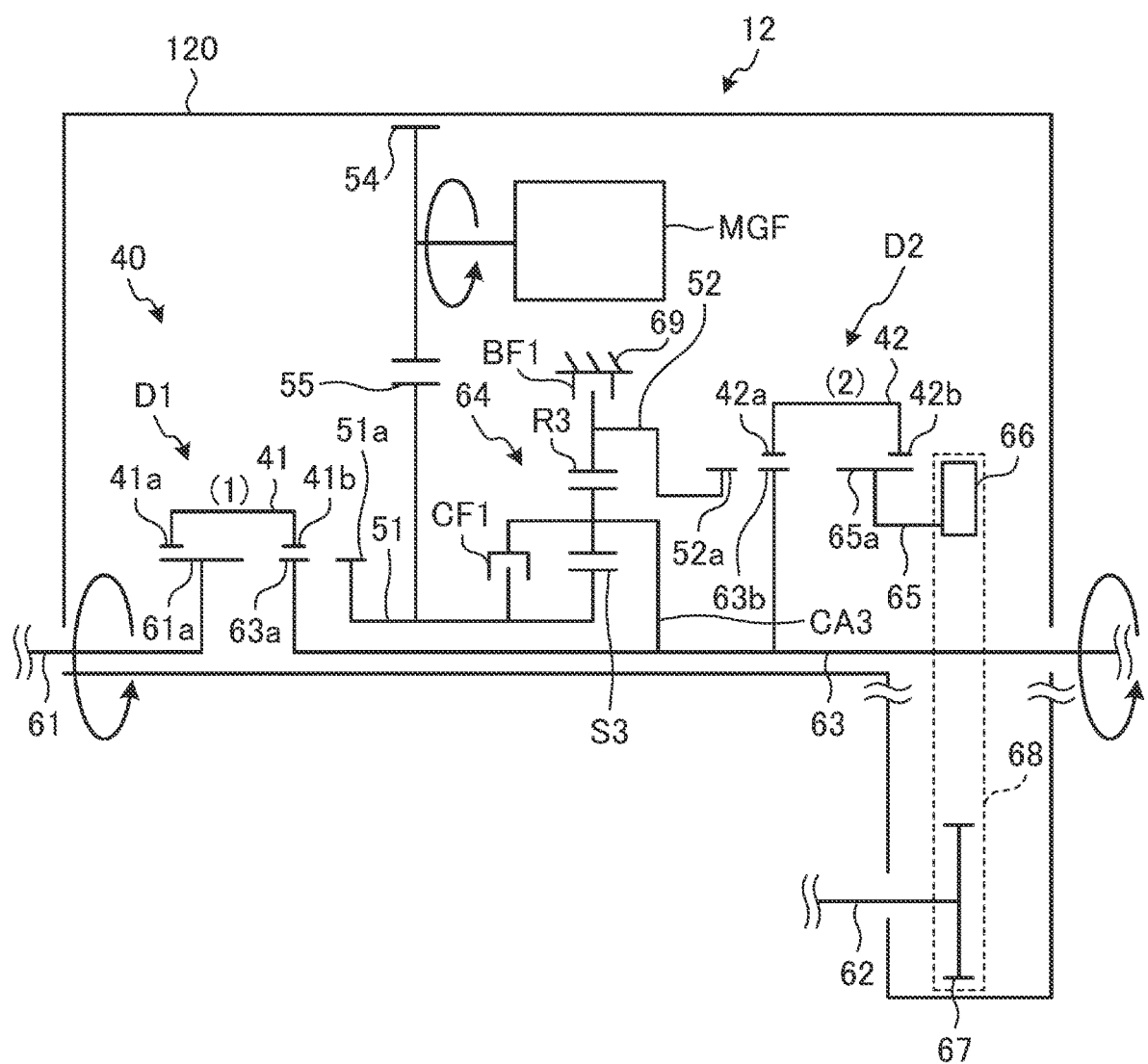
FIG. 23 is a skeleton diagram showing a case where the transfer according to the second embodiment is in the fifth drive state.

FIG. 23 is a skeleton diagram showing a case where the transfer 12 according to the second embodiment is in the fifth drive state. The fifth drive state is a drive state in a mode in which the power transferred to the transfer 12 in the H4_Lock mode (fixed distribution 4WD) is distributed to the front wheel 3 side and the rear wheel 4 side to cause the vehicle 1 to travel, and is also in a four-wheel drive state in which the power is transferred to the front wheels 3 and the rear wheels 4. The fifth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. Note that, in the fifth drive state, the transfer 12 is set to the high-speed side shift stage Hi.

When the transfer 12 is in the fifth drive state, as shown in FIG. 19, the brake BF1 is disengaged, the clutch CF1 is disengaged, the first dog clutch D1 is in the first input state (1), and the second dog clutch D2 is in the second transfer state. Note that, (1) in the first dog clutch D1 in FIG. 23 indicates that the first dog clutch D1 is in the first input state. Further, (2) in the second dog clutch D2 in FIG. 23 indicates that the second dog clutch D2 is in the second transfer state.

Figure 24:
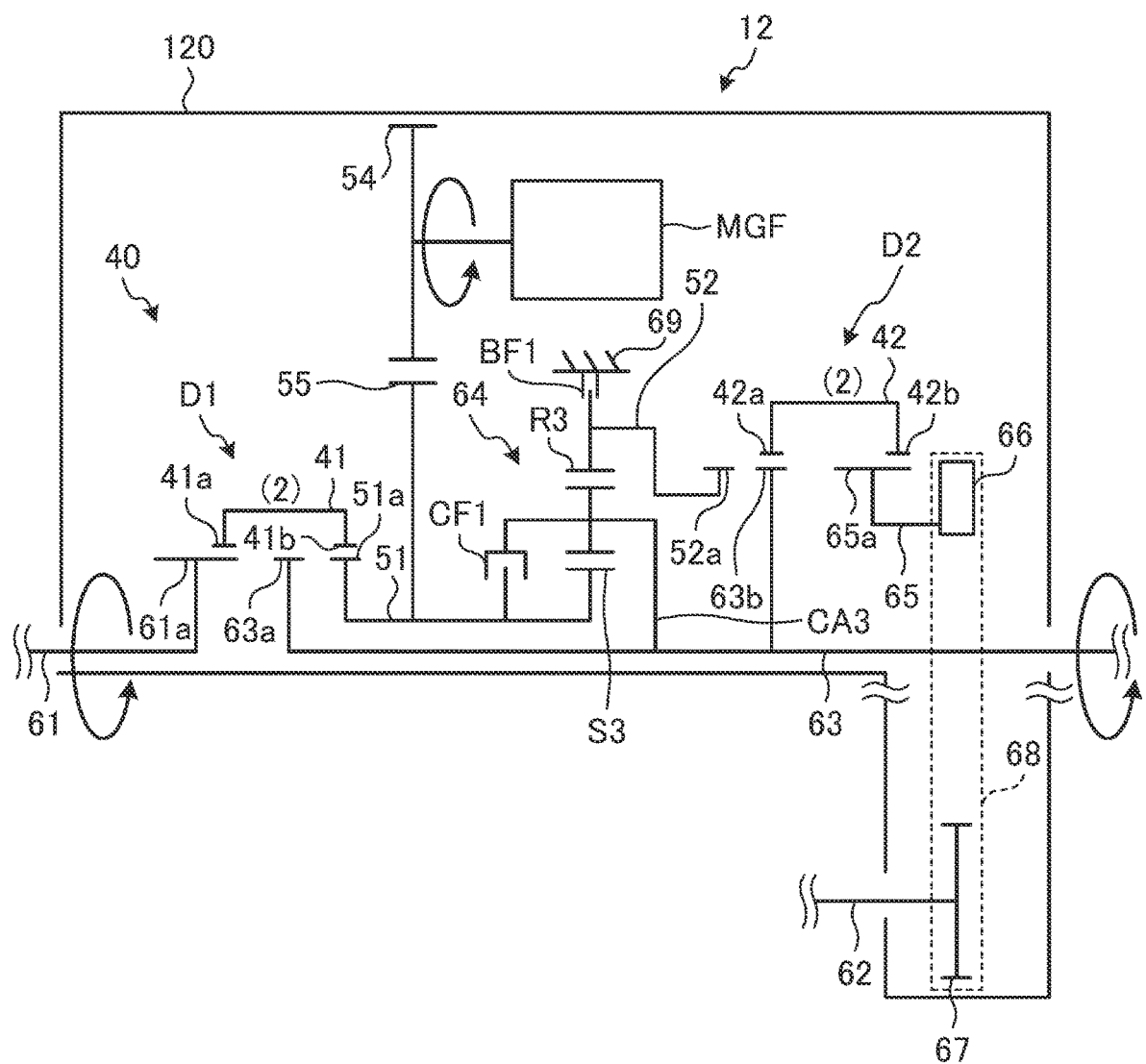
FIG. 24 is a skeleton diagram showing a case where the transfer according to the second embodiment is in the sixth drive state.

FIG. 24 is a skeleton diagram showing a case where the transfer 12 according to the second embodiment is in the sixth drive state. The sixth drive state is a drive state in a mode in which the power transferred to the transfer 12 in the L4_Lock mode (fixed distribution 4WD) is distributed to the front wheel 3 side and the rear wheel 4 side to cause the vehicle 1 to travel, and is also in the four-wheel drive state in which the power is transferred to the front wheels 3 and the rear wheels 4. The sixth drive state is a drive state in which the rotational differential between the front wheel side output shaft 62 and the rear wheel side output shaft 63 is disabled, and the torque distribution ratio at which the torque from the input shaft 61 is distributed to the front wheel side output shaft 62 and the rear wheel side output shaft 63 is fixed. In the sixth drive state, the transfer 12 is set to the low-speed side shift stage Lo.

When the transfer 12 is in the sixth drive state, as shown in FIG. 19, the brake BF1 is engaged, the clutch CF1 is disengaged, the first dog clutch D1 is in the second input state, and the second dog clutch D2 is in the second transfer state. Note that, (2) in the first dog clutch D1 in FIG. 24 indicates that the first dog clutch D1 is in the second input state. Further, (2) in the second dog clutch D2 in FIG. 24 indicates that the second dog clutch D2 is in the second transfer state.

Then, in the drive device 10 according to the second embodiment, various controls to be executed by the electronic control device 100 described in the first embodiment using FIGS. 15 and 16 and the like can be implemented. At this time, the EV(FF)_Hi mode and the EV(FF)_Lo mode in the first embodiment may be replaced with the EV(FR)_Hi mode and the EV(FR)_Lo mode.

That is, similar to the configuration that has been described in the first embodiment with reference to FIGS. 15 and 16 and the like, when the EV(FR)_Lo mode as the second traveling mode is switched to the H4_torque split mode or the H4_LSD mode as the first traveling mode, the drive device 10 according to the second embodiment disengages the brake BF1 and executes synchronous control in which the number of rotations (rotational speed) of the front wheel side output shaft 62 is synchronized with that of and the ring gear R3 by the clutch CF1. The drive device 10 then switches the second dog clutch D2 from the disconnected state (disengaged state) to the connected state (first transfer state) in which the second dog clutch D2 connects the ring gear R3 and the front wheel side output shaft 62.

Accordingly, with the drive device 10 according to the second embodiment, when the EV(FR)_Lo mode is switched to the H4_torque split mode or the H4_LSD mode, the rear wheel side output shaft 63 and the ring gear R3 can be appropriately connected by the second dog clutch D2.

In the first embodiment and the second embodiment, when the transfer 12 is set to the first drive state (EV(FF)_Hi mode, EV(FR)_Hi mode) and the second drive state (EV(FF)_Lo mode, EV(FR)_Lo mode), the first dog clutch D1 is set to the first input state. However, the first dog clutch D1 may be set to the disengaged state.

Further, in the first embodiment and the second embodiment, the transfer 12 includes the first dog clutch D1 so as to set the sixth drive state (L4_Lock mode). However, the first dog clutch D1 may be omitted when the sixth drive state is not set. In this case, the input shaft 61 and the rear wheel side output shaft 63 are constantly connected.

Further, in the first embodiment and the second embodiment, the clutch CF1 selectively engages the sun gear S3 with the carrier CA3. However, the clutch CF1 may selectively engage the carrier CA3 with the ring gear R3, or may selectively engage the sun gear S3 with the ring gear R3.

What is claimed is:

1. A vehicle drive device, comprising:
   a first power source;
   a second power source;
   a first output shaft that is connected to the first power source and outputs power to one of front wheels and rear wheels;
   a second output shaft that outputs power to the other of the front wheels and the rear wheels;
   a differential mechanism provided with a first rotating element, a second rotating element, and a third rotating element; and
   a processor, wherein:
   in the differential mechanism,
      the first rotating element is connected to the second power source,
      one output shaft of the first output shaft and the second output shaft is connected to the second rotating element,
      the other output shaft of the first output shaft and the second output shaft is connected to the third rotating element via a disconnection-connection mechanism so as to be disconnectable and connectable,
      the third rotating element is selectively fixed to a fixing member through engagement of a first engaging element, and
      any two of the first rotating element, the second rotating element, and the third rotating element are selectively connected through engagement of a second engaging element;
   the processor is configured to
      place the disconnection-connection mechanism in a connected state in which the disconnection-connection mechanism connects the other output shaft and the third rotating element when a first traveling mode in which a vehicle travels in a four-wheel drive state using at least the power output from the first power source is set,
      place the disconnection-connection mechanism in a disconnected state in which the disconnection-connection mechanism disconnects the other output shaft from the third rotating element and engage the first engaging element when a second traveling mode in which the vehicle travels in a two-wheel drive state using the power output from the second power source is set, and
      perform a switching process where the second traveling mode is switched to the first traveling mode; and
   the switching process includes
      executing synchronous control by disengaging the first engaging element and simultaneously engaging the second engaging element to synchronize rotational speeds of the other output shaft and the third rotating element with each other, and
      switching the disconnection-connection mechanism from the disconnected state to the connected state in response to completion of the synchronous control,
   wherein the first traveling mode includes:
      a traveling mode where torque transmitted to the third rotating element is distributed to the front wheels and the rear wheels at an arbitrary ratio by disengaging the second engaging element, and
      a traveling mode where a rotational differential between the first output shaft and the second output shaft is restricted by controlling the second engaging element to a half-engaged state.

2. The vehicle drive device according to claim 1, wherein the processor is configured to cause the second power source to output the power even under the synchronous control in addition to a case where the second traveling mode is set.

3. The vehicle drive device according to claim 1, wherein the processor is configured to disengage the second engaging element after the disconnection-connection mechanism is switched from the disconnected state to the connected state in a process where the second traveling mode is switched to the first traveling mode.

\* \* \* \* \*